(12) United States Patent
Mark et al.

(10) Patent No.: US 11,650,739 B1
(45) Date of Patent: May 16, 2023

(54) METHOD FOR GENERATING CRASH-CONSISTENT BACKUP OF SOURCE VOLUME AND APPARATUS ASSOCIATED THEREWITH

(71) Applicant: DATTO, INC., Norwalk, CT (US)

(72) Inventors: Stuart Mark, Norwalk, CT (US); Edward Boren, Norwalk, CT (US)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 17/557,436

(22) Filed: Dec. 21, 2021

(51) Int. Cl.
*G06F 3/06* (2006.01)

(52) U.S. Cl.
CPC ............ *G06F 3/0619* (2013.01); *G06F 3/064* (2013.01); *G06F 3/065* (2013.01); *G06F 3/0673* (2013.01)

(58) Field of Classification Search
CPC ........ G06F 3/0619; G06F 3/064; G06F 3/065; G06F 3/0673
See application file for complete search history.

(56) References Cited

U.S. PATENT DOCUMENTS

| 2001/0014049 A1* | 8/2001 | Woo ...................... G11C 11/406 365/211 |
| 2017/0091106 A1* | 3/2017 | Ash ........................ G06F 3/0689 |
| 2019/0042373 A1 | 2/2019 | Mark |
| 2019/0250995 A1 | 8/2019 | Mark et al. |
| 2019/0391878 A1 | 12/2019 | Mark et al. |
| 2020/0081642 A1* | 3/2020 | Brown .................. G06F 3/0604 |
| 2020/0356493 A1* | 11/2020 | Mukherjee .......... G06F 12/1009 |
| 2021/0165575 A1 | 6/2021 | Hutcheson, Jr. et al. |

* cited by examiner

*Primary Examiner* — Jason W Blust
(74) *Attorney, Agent, or Firm* — Maschoff Brennan

(57) ABSTRACT

A method for generating a crash-consistent backup of a source volume includes designating certain blocks of an operating source volume to be copied to a target volume, copying the designated blocks from the source volume to the target volume; initiating a time-based tracking process and detecting writes to blocks of the source volume. Using the time-based tracking process to maintain a time-ordered list of blocks that are written to during the copying of blocks to the target volume and to determine when the blocks on the target volume are in a sane state that permits a crash-consistent backup. After the designated blocks are copied, using the time-ordered list to continue copying blocks to the target volume. After the time-tracking process determines the blocks on the target volume are crash consistent (i.e., in a sane state), a snapshot can be transferred to a backup volume and time-tagged as a crash-consistent backup.

20 Claims, 13 Drawing Sheets

METHOD FOR GENERATING CRASH-CONSISTENT BACKUP OF SOURCE VOLUME AND APPARATUS ASSOCIATED THEREWITH

CROSS REFERENCE TO RELATED PATENTS AND APPLICATIONS

The following patents and applications, the disclosures of each being totally incorporated herein by reference are mentioned:

U.S. Pat. App. Publication No. 2021/0165575, published Jun. 3, 2021, entitled "COPY-ON-WRITE SYSTEMS AND METHODS" to Datto, Inc., inventors Hutcheson et al., application Ser. No. 17/170,094, filed Feb. 8, 2021.

U.S. Pat. App. Publication No. 2019/0391878, published Dec. 26, 2019, entitled "SOURCE VOLUME BACKUP WITH ADAPTIVE FINALIZATION APPARATUSES, METHODS AND SYSTEMS" to Datto, Inc., inventors Mark et al., application Ser. No. 16/391,205, filed Apr. 22, 2019, U.S. Pat. No. 10,915,407, issued Feb. 9, 2021.

U.S. Pat. App. Publication No. 2019/0250995, published Aug. 15, 2019, entitled "SOURCE VOLUME BACKUP WITH PREDICTIVE AND LOOKAHEAD OPTIMIZATIONS APPARATUSES, METHODS AND SYSTEMS" to Datto, Inc., inventors Mark et al., application Ser. No. 16/391,243, filed Apr. 22, 2019, U.S. Pat. No. 11,093,344, issued Aug. 17, 2021.

U.S. Pat. App. Publication No. 2019/0042373, published Feb. 7, 2019, entitled "SYSTEMS AND METHODS FOR COPYING AN OPERATING SOURCE VOLUME" to Datto, Inc., inventor Mark, application Ser. No. 16/055,347, filed Aug. 6, 2018, U.S. Pat. No. 10,884,871, issued Jan. 5, 2021.

FIELD

The disclosure relates to various exemplary embodiments of a method for generating a crash-consistent backup of a source volume. Various embodiments of a system to implement the various methods for generating a crash-consistent backup of a source volume are also disclosed. These various embodiments copy blocks of the source volume while an operating system continues to actively perform writes to the source volume. This can be implemented to provide a full backup of the source volume relating to a point in time at which the backup is crash consistent. It is understood that certain embodiments can be implemented to provide copying for other types of crash-consistent backups, such as incremental backups and differential backups.

BACKGROUND

Computer system backups are utilized to protect data from being lost due to equipment failures, malware, and accidental deletions. A backup may involve copying files to be backed up from one location to another location. For example, files may be copied from a solid-state drive in a user's desktop to an external hard drive that may be connected to the user's desktop via USB.

BRIEF DESCRIPTION

In one aspect, a method for generating a crash-consistent backup of a source volume is provided. In one embodiment, the method includes: designating at least a portion of a plurality of blocks of a source volume to be copied to a target volume by a backup application program; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the backup application program, the time-based tracking process including: initiating a time-ordered queue, wherein each queue item includes a block identifier field, a time field, and a reference count field; and detecting writes to blocks of the source volume; and, in conjunction with each detected write, the time-based tracking process further including: reading a block identifier for the block of the source volume associated with the detected write; if the block identifier is not present in the time-ordered queue, setting a reference count for the block identifier to one (1) and adding the block identifier, a time relating to the detected write, and the reference count to corresponding fields of a queue item at a back end of the time-ordered queue; and if the block identifier is present in the time-ordered queue, incrementing the reference count in the queue item associated with the block identifier, updating the time in the queue item to a time relating to the detected write, and moving the queue item to the back end of the time-ordered queue.

In another aspect, an apparatus for generating a crash-consistent backup of a source volume is provided. In one embodiment, the apparatus includes: a source volume configured to store data in a plurality of blocks; a target volume in operative communication with the source volume and configured to store a backup of the source volume; at least one processor and associated memory in operative communication with the source volume and the target volume, the associated memory storing program instructions that, when executed by the at least one processor, cause the apparatus to perform a method for generating a crash-consistent backup of the source volume. In one embodiment, the method including: designating at least a portion of the plurality of blocks of the source volume to be copied to the target volume; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the program instructions, the time-based tracking process including: initiating a time-ordered queue, wherein each queue item includes a block identifier field, a time field, and a reference count field; and detecting writes to blocks of the source volume; in conjunction with each detected write, the time-based tracking process further including: reading a block identifier for the block of the source volume associated with the detected write; if the block identifier is not present in the time-ordered queue, setting a reference count for the block identifier to one (1) and adding the block identifier, a time relating to the detected write, and the reference count to corresponding fields of a queue item at a back end of the time-ordered queue; and if the block identifier is present in the time-ordered queue, incrementing the reference count in the queue item associated with the block identifier, updating the time in the queue item to a time relating to the detected write, and moving the queue item to the back end of the time-ordered queue; and upon completion of the copying of the designated portion of blocks and while continuing the time-based tracking process, the method further including: reading the block identifier from a queue item at a front end of the time-ordered queue; copying the block of the source volume corresponding to the block identifier read from the time-ordered queue to the target volume while the operating system associated with the source volume is configured to continue writing to the source volume; removing the queue item from the front end of the queue; and repeating the reading, copying, and removing for a next queue item in the time-ordered queue where the reference count for at least one queue item remaining in the time-ordered queue is greater than one (1); wherein, where the reference counts for the queue items remaining in the time-ordered queue are one (1), the target volume holds a crash-consistent backup of the source volume at a point in time relating to the copying to the target volume of a latest reading, copying, and removing iteration.

In yet another embodiment, the method for generating a crash-consistent backup of a source volume includes: designating at least a portion of a plurality of blocks of a source volume to be copied to a target volume by a backup application program; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the backup application program, the time-based tracking process including: initiating a time-ordered queue, wherein each queue item includes a block identifier field, a time field, and a storage location field; and detecting writes to blocks of the source volume; and, in conjunction with each detected write, the time-based tracking process further including: reading a block identifier for the block of the source volume associated with the detected write; storing a temporary copy of the block of the source volume associated with the detected write in a data storage device; and adding the block identifier, a time relating to the detected write, and a storage location for the temporary copy to corresponding fields of a queue item at a back end of the time-ordered queue.

DETAILED DESCRIPTION

Figure 1:
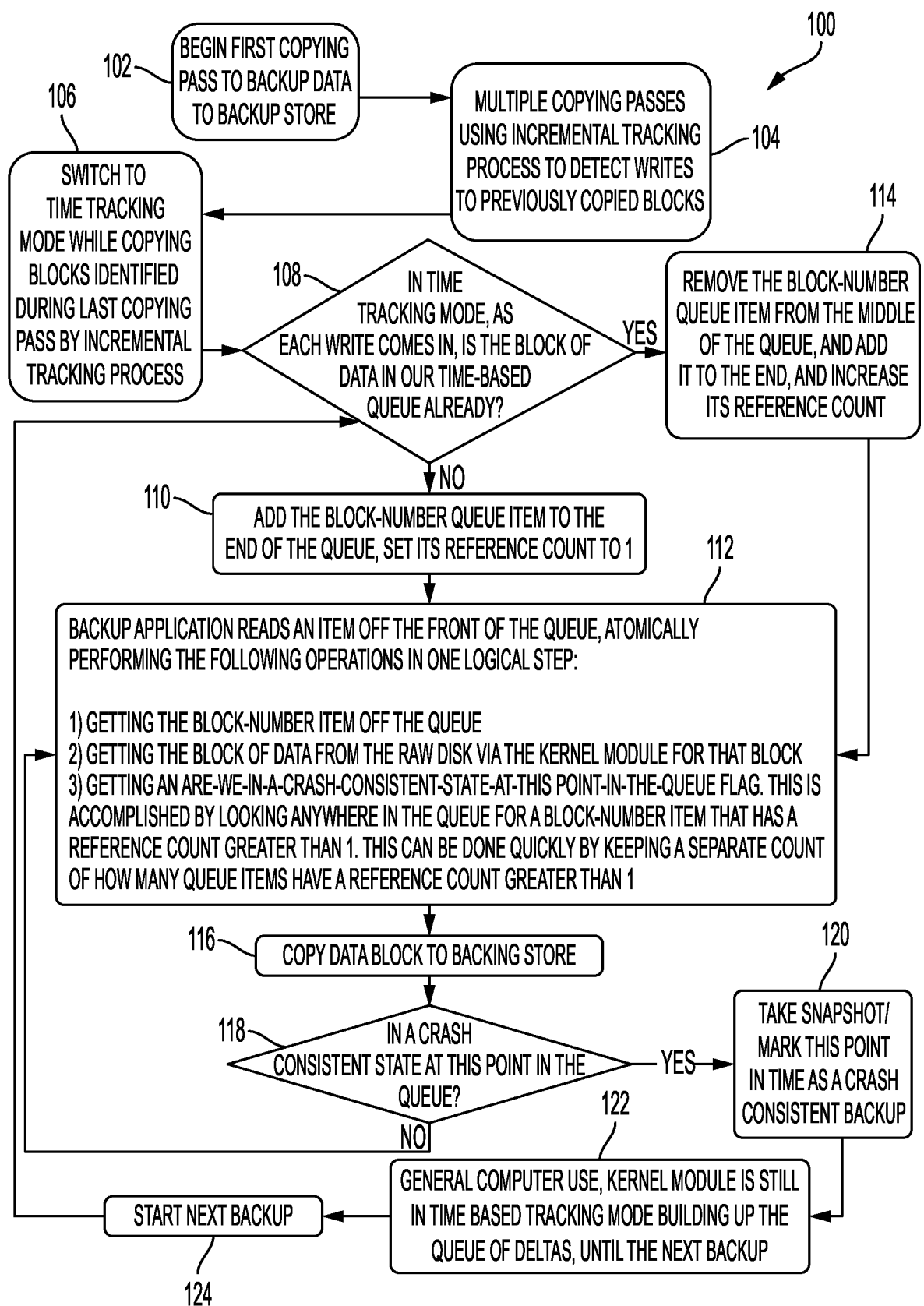
FIG. 1 is a flow chart showing an exemplary embodiment of a process for generating a crash-consistent backup of a source volume.

In computer data storage, a volume is a single accessible storage area with a single file system. A volume may be referred to as a logical volume or a logical drive. Logical volumes can be written to by one or more operating systems. These logical volumes can also be copied for multiple purposes, such as for backup of critical data or applications, or to make the contents of the source logical volume available at another time or location.

One way to create a copy of a source logical volume that is crash-consistent is to suspend all writes to the source volume while the copying process is ongoing. This can be achieved by instructing an operating system managing the source logical volume to stop writing to the source volume while the source volume is being copied to a target volume. However, for large logical volumes, this can impose an undesirable burden on performance since the time required to copy the source volume may be lengthy. For instance, the copying procedure may take hours, during which the source volume may be unable to accept new write requests.

Another way to create a copy of a source logical volume that is crash consistent is to cause the operating system managing the source volume to enter a copy-on-write (COW) mode before the copying process starts, and to remain in the COW mode until the source volume is completely copied to the target volume. A source volume can be considered to comprise multiple "blocks" of storage, wherein each block stores a certain amount of data. When in COW mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied, the operating system can copy the original, un-modified contents of the to-be-modified block to a "copy-on-write file" or "COW file", thereby preserving the original state of the to-be-modified block. After the original contents of the to-be-modified block have been safely copied to the COW file, the operating system can allow the write instruction to modify the block.

At a later time, when the process copying the source volume to the target volume attempts to copy the modified block, the copying process can be re-directed to copy from the portion of the COW file that stores the original contents of the modified block. In this way, the copy of the source volume that is copied to the target volume remains crash consistent because it reflects the state of the source volume at the instant the operating system entered COW mode (i.e., at the beginning of the copy process). A copy of a source logical volume that is crash consistent is typically associated with a time designation, where the time designation refers to a time that the copy process commenced, at which time the copy is crash consistent.

However, causing the operating system to enter a COW mode can also impact the performance and responsiveness of the operating system and the source volume. Requiring the operating system to examine every write instruction to the source volume, and potentially copy blocks of the source volume to the COW file, can tie up scarce computational resources needed for other operating system processes. Furthermore, COW mode can decrease the perceived speed with which the source volume responds to write instructions. If the copying process takes a long time, and if the operating system makes many writes to the source volume during the copying process, a large amount of storage may need to be reserved for the COW file to store the large number of blocks that are modified. In some systems, this storage for the COW file must be reserved in advance, even though the operating system cannot predict exactly how long the copying process will take, or how many writes will need to be made to the source volume during the copying process. If the storage reserved for the COW file is too small to hold all the blocks that were modified during the copying process, the entire copying process may fail. In these cases, the copying process may need to be re-started from the beginning. If the storage reserved for the COW file is too large, less memory storage space is available for other data and/or applications.

These problems are exacerbated when copying large amounts of data to remote sites via network connections, such as Internet communication to the cloud. Communication over the Internet can be a relatively slow process compared to processes such as computation, file edits, and local copying. Such communication lengthens the copying process leading to more time for growth of the COW file and presents problems with data transmission interruptions. Accordingly, systems and methods for copying data and data volumes are needed to address the shortcomings of current approaches. Thus, it is desirable to provide an improved backup solution without the drawbacks mentioned above.

Provided in various embodiments are methods and systems for generating a crash-consistent backup of a source volume. The various embodiments disclosed herein provide techniques that make backup processes more efficient, quicker, and less complex. Instead of trying to maintain the state of the disk artificially with a lot of effort, the techniques disclosed herein let the disk operate normally and pay very close attention to when it is in a state that can be backed up in a crash-consistent way. For example, while backing up data on the live disk, careful tracking of writes to the disk permits identification of a point in time where the data that has been copied is known to be in a crash-consistent state.

Backups of live machines can be accomplished by employing a complicated kernel module in Windows and Linux that can maintain the state of a point in time of a volume by storing data that changes on disk during a backup in a copy-on-write (COW) file. Maintaining the COW file is complicated and slows down the computer during a backup. Over the years, various solutions to the resource problem associated with COW files have been presented. These earlier solutions add complexity in trade for disk space used. The various embodiments disclosed herein circumvent existing problems by avoiding the need to COW data altogether. These embodiments remove complexity while still allowing generation of a crash-consistent backup. Using the techniques disclosed herein, the backup process is a more lightweight procedure because the kernel module processing load is reduced.

The various embodiments disclosed herein integrate new techniques into existing backup processes to enable a backup agent to get a point-in-time, crash-consistent backup without having to switch to a COW mode or use a COW file. This does away with the complicated COW mode processing and the managing of COW files during a backup and reduces the processing load of the kernel module.

In various embodiments, the backup process can perform concurrent copying passes of the live disk until, for example, reaching a point where the passes become generally shorter and the amount of data being copied is generally less. Then, instead of switching to a COW mode where a virtual device would be created for the backup application to use for the copying, the kernel module can be switched to a time-based tracking mode where it tracks block writes to a source volume and feeds this information to the user space backup application to perform the copying for the backup. In one embodiment, the kernel module may also accumulate the written data for the backup program. These techniques ensure the copying for the backup is performed in a time-ordered fashion. At any point thereafter, when the backup program has caught up enough in its backup that it knows there are no out-of-order blocks remaining to be copied in the future, the backup point in time can be marked and the kernel module can be switched back to normal block-write incremental tracking that does not necessarily need to include the time information or the written data.

The time-based tracking process runs long enough to let the user space backup application copy the data from the last concurrent copying pass, and then hold the written data and/or metadata about the written data, in the time order in which it was written, making sure there are no out-of-order duplicate writes and feed them to the backup application in a near real time manner (i.e., offset from the time of the written data but as close to real time as possible). Once the backup program is done copying data from the last concurrent copying pass, the time-based tracking process can check for writes queued up to be backed up that would conflict with the data already copied by the backup program.

During a backup, the backup application is always copying data from the live disk, in one exemplary embodiment of a time-based tracking mode, the time-based tracking process makes sure that, when the backup application copies something, it is not copying data from the disk that was over-written at a time after the time the backup process began copying. In other words, the time-based tracking process makes sure the copying is in time order.

In one embodiment, after the process switches to time-based tracking mode, the kernel module keeps a copy of the data for blocks written to by the operating system and adds a destination position for the copy to the time-ordered queue. When the user space backup application needs to copy the data for the backup, the kernel module hands over the actual data (i.e., copy of the written data) in the order it was written. If there are multiple writes to the same block, the kernel module keeps all copies and hands them over to the backup program in the order they were written. Using this method, the backup application can make the point in time of the crash-consistent backup at any time because the written blocks are copied to the backup in the time order the blocks were written. As mentioned above, the copying to the backup is just a little behind real time (i.e., near real time).

The embodiment described in the previous paragraph uses a lot of memory because the kernel module temporarily stores all the actual data written to disk while the user space backup application tries to catch up copying the last concurrent copying pass. An alternative solution does not store the actual written data in the kernel module. Rather, the kernel module stores metadata (e.g., what block, and the time it was written) as well as a reference count to the block to be used to determine if the block written on disk is from a future write or not.

In another embodiment, when in time-based tracking mode, the kernel module writes to a time-ordered queue the list of block numbers that were written. At the same time, the backup application asks the kernel module to pull items off the front of the queue to write. There will be a gap of time between what the kernel is adding to the end of the queue and what the user space backup application is pulling off the front of the queue.

If the same block is written to twice in this period of time, the data that actually exists on disk when the user space backup application goes to read the block for the first time is the data that exists after the second write. This is the wrong data for that point in time. If the block were read, it would be out of order. That is not necessarily a problem but a snapshot of the backup at that point in time would be crash inconsistent because the image in the backup is not at a crash-consistent point when all the writes that were copied to the backup are not in time order.

The time-based tracking process keeps track of when the backup is in a 'sane' state. For example, when there are no blocks in the queue that have been written to more than once, the queue is in a 'sane' state. At any point when the backup is in a sane state, the backup can be considered crash consistent. In other words, determining the 'sane' state is a precursor to determining an intermediate backup is crash consistent and generating a crash-consistent backup suitable for data recovery. A snapshot of the intermediate crash-consistent backup can be taken and marked for the point in time because all blocks in the backup at that point are copied in time order. For example, the snapshot can be a Zettabyte file system (ZFS) snapshot, a Unix file system (UFS) snapshot, or any suitable file system snapshot using a suitably compatible snapshot technology. The marked snapshot can be transferred to a backup volume yielding a crash-consistent backup that is suitable for recovery to the marked point in time.

In one embodiment, a technique to determine if the time-based tracking process is in a sane state includes detecting a write to a particular block, adding the block number and a reference count of one (1) to the queue. In this embodiment, the block data does not need to be saved or added to the queue.

In a further embodiment, an entry can be added to a hash map that is keyed off the block number. The value of the hash is a node referencing information about that block. For example, the node can be a reference count for the block. If the entry does not exist in the hash map, an entry is created pointing to the node with a reference count of one (1) for the block to which the write was detected. If the entry exists in the hash map, the reference count in the node is incremented. This allows the time-based tracking process to keep track of the duplicate (i.e., multiple) entries in the queue for the same block. The queue item is added to the back of the queue. This queue item represents both block writes, but only after the second one is copied by the backup application will the queue be back in a 'sane' state.

In another further embodiment, the time-based tracking process uses a global queue reference count covering the entire queue. This reference count is incremented when any hash map block entry reference count goes from one (1) to two (2) (denoting that there is now a duplicate) and decremented when any hash map entry reference count goes below two (2). In this way, the time-based tracking process has access to one reference count number that can be looked at to see if the queue is in a 'sane' state or not. As discussed above, if there are any duplicate blocks anywhere in the queue it is not in a 'sane' state.

As for the user space backup application, when the application is ready to read a block, it asks the kernel module for the item at the front of the queue. If the block number in the queue item points to a hash map entry item with a reference count of one (1) (i.e., denoting there is only one entry for this block in the queue), it reads the data off disk for that block, returns it to user space backup application to be backed up along with the value of the global queue reference count. The kernel module removes the entry (i.e., item) from the front of the queue and removes the entry from the hash map since the reference count was 1.

The time-based tracking process is repeated until the user space backup application decides it is ready to complete the backup. The user space backup application determines it is ready, for example, by checking the global queue reference count to see if it is zero or not. If the global queue reference count is zero, the queue is in a 'sane' state and the backup is in a crash consistent state. Thus, the global queue reference count indicates when it is safe to stop copying and generate a crash-consistent backup.

The backup program does not need to catch up to the end of the time-ordered queue, it just needs to get to a point where the queue is in a sane state. At that point, the backup application can switch back to the incremental tracking mode and copy all the blocks remaining in the queue to an incremental tracking bitmap to be used for a first concurrent copying pass at the start of a next backup.

In summary, the backup application uses a concurrent copying process to make quicker passes for copying the changed data since the last backup, right off the disk, to a point where the amount of data in the concurrent copying pass is small. Once the concurrent copying pass is small enough, the backup application uses a time-based tracking mode to initiate a queue and starts keeping an ordered list of the writes during the last concurrent copying pass in the queue while the last pass copies certain blocks to the backup. After that last concurrent copying pass of data is backed up, the backup process continues the backup by burning off the queue until a point where the queue is in a sane state. At that point, the backup process completes the backup by generating a time-tagged crash-consistent backup.

In yet another embodiment, the time-based tracking process uses techniques that limit the size of the queue to avoid situations that may lead to the queue being excessively lengthy and/or growing in size over a long period of time. For example, if the backup process removes the concurrent copying part (after a first backup) and just uses an always-tracking-writes-into-the-queue part, the queue could conceivably grow in size forever. The normal incremental tracking part uses a bitmap to represent all the blocks on the disk. This block representation bitmap is a fixed size chunk of memory that can never grow while the queue may end up including more entries than the total amount of blocks on the disk.

When using time-based tracking, the backup application needs to know if the block being written is already in the queue when the write is happening (i.e., when the reference count is increased for the block). However, the backup application does not necessarily need to know more than that. In embodiment where the time-based tracking process keeps a hash map as well as the queue, the hash map is keyed by the block number and points to the node that exists on the queue for that block. When a second write for the same block is detected, the time-based tracking process finds the existing item in the queue associated with the block, moves that queue item to the end of the queue, and increments the reference count for that block. The time-based tracking process updates the hash map accordingly. In this embodiment, one queue item covers all in-flight writes to that block and is at the position in the queue of the latest write.

This also means that, when the backup application pulls an item from the front of the queue, it represents all writes to that block and results in all the block writes it represents to be written to the backup at once. This permits removal of the queue item in conjunction with copying the block to the backup. Additionally, the reference count check for the global reference count flag is decremented in conjunction with the copying if the reference count of the block was greater than 1.

In this embodiment, the amount of memory used for each written block in the time-based tracking process is the sum of a) a block metadata entry that goes on the queue, b) the queue entry itself, and c) the hash map entry for that block. The maximum amount of memory required for the device is this sum multiplied by the total number of blocks on the device. This is more memory than a bitmap of one bit per block, but it represents a worst-case scenario based on every block being written at least once between backups. This worst-case scenario is unlikely to occur. Rather, for short periods of time between backups, the amount of memory used might be less than or at least comparable to the bitmap maintained for the incremental block tracker. Particularly if the disk is large.

In the various embodiments, the backup application uses a concurrent copying pass, a DiffMerge process, or another suitable copying process for a first copying pass to the backup. However, after the first copying pass, the application program can stay in time-based tracking mode and when it starts to take a backup it starts processing blocks off the front of the queue until the queue gets to a sane state. Typically, the queue size is relatively small when it reaches a sane state.

With reference to FIG. 1, an exemplary embodiment of a process 100 for generating a crash-consistent backup of a source volume begins at 102 where a first copying pass to backup data to a backup store begins. At 104, the process continues with multiple copying passes using an incremental tracking process to detect writes to previously copied blocks. At 106, the process switches to a time tracking mode while copying blocks identified during a last copying pass by the incremental tracking process. At 108, in the time tracking mode, as each write comes in, the process determines if the block of data is already in a time-based queue. If the block is not in the queue, at 110, a queue item with the block number is added to the end of the queue and a reference count for the block number is set to one (1). At 112, the backup application reads an item off the front of the queue and atomically performs the following operation in one logical step: 1) getting the block-number item from the front of the queue; 2) getting the block of data from the raw disk via the kernel module for that block; and 3) getting an are-we-in-a-crash-consistent-state-at-this-point-in-the-queue flag. Determining the flag is accomplished by looking anywhere in the queue for a block-number item that has a reference count greater than one (1). This can be determined quickly by keeping a separate count of how many queue items have a reference count greater than one (1). After 106, if the block is in the queue, the process 100 advances to 114 where the block-number queue item is removed from the middle of the queue, added to the end of the queue, and the corresponding reference count is increased. From 114, the process 100 advances to 112.

At 116, the application program copies the data block for the block-number item read from the queue in 112 to the backing store. At 118, the application program determines if the queue is in a crash-consistent state at this point. If the queue is not in a crash-consistent state, the process 100 advances from 118 to 112 to read the next item off the front of the queue. If the queue is in a crash-consistent state, the process 100 advances from 118 to 120 where the application program takes a snapshot of the backup store and marks this point in time as a crash-consistent backup. For example, the snapshot can be a Zettabyte file system (ZFS) snapshot, a Unix file system (UFS) snapshot, or any suitable file system snapshot using a suitably compatible snapshot technology. At 122, the device continues in general computer use and the kernel module is still in time-based tracking mode building up the queue of deltas. This continues until the next backup. At 124, the next backup starts and the process 100 advances to 108.

Figure 2A:
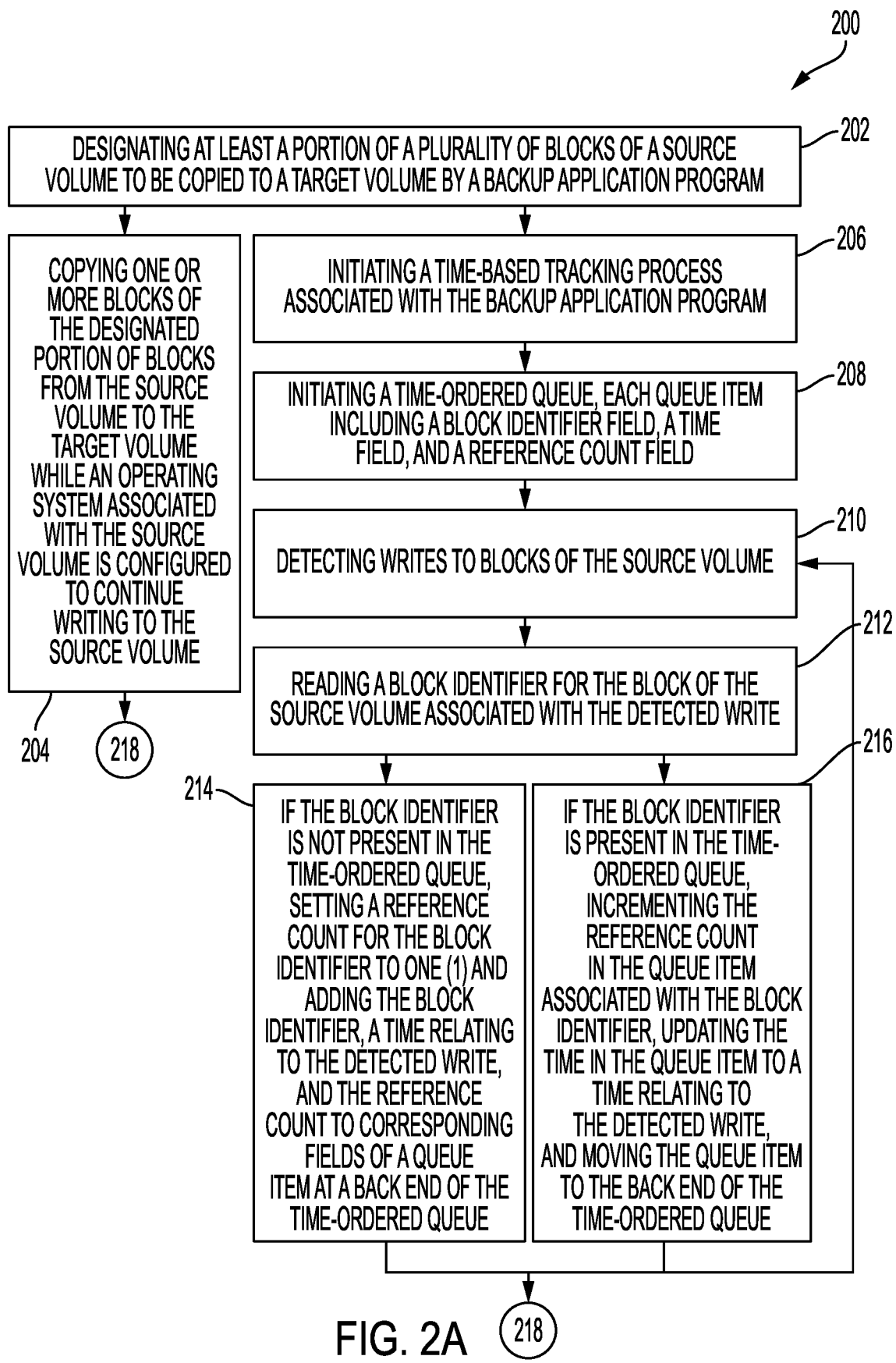
FIGS. 2A and 2B is a flow chart showing another exemplary embodiment of a process for generating a crash-consistent backup of a source volume.
Figure 2B:
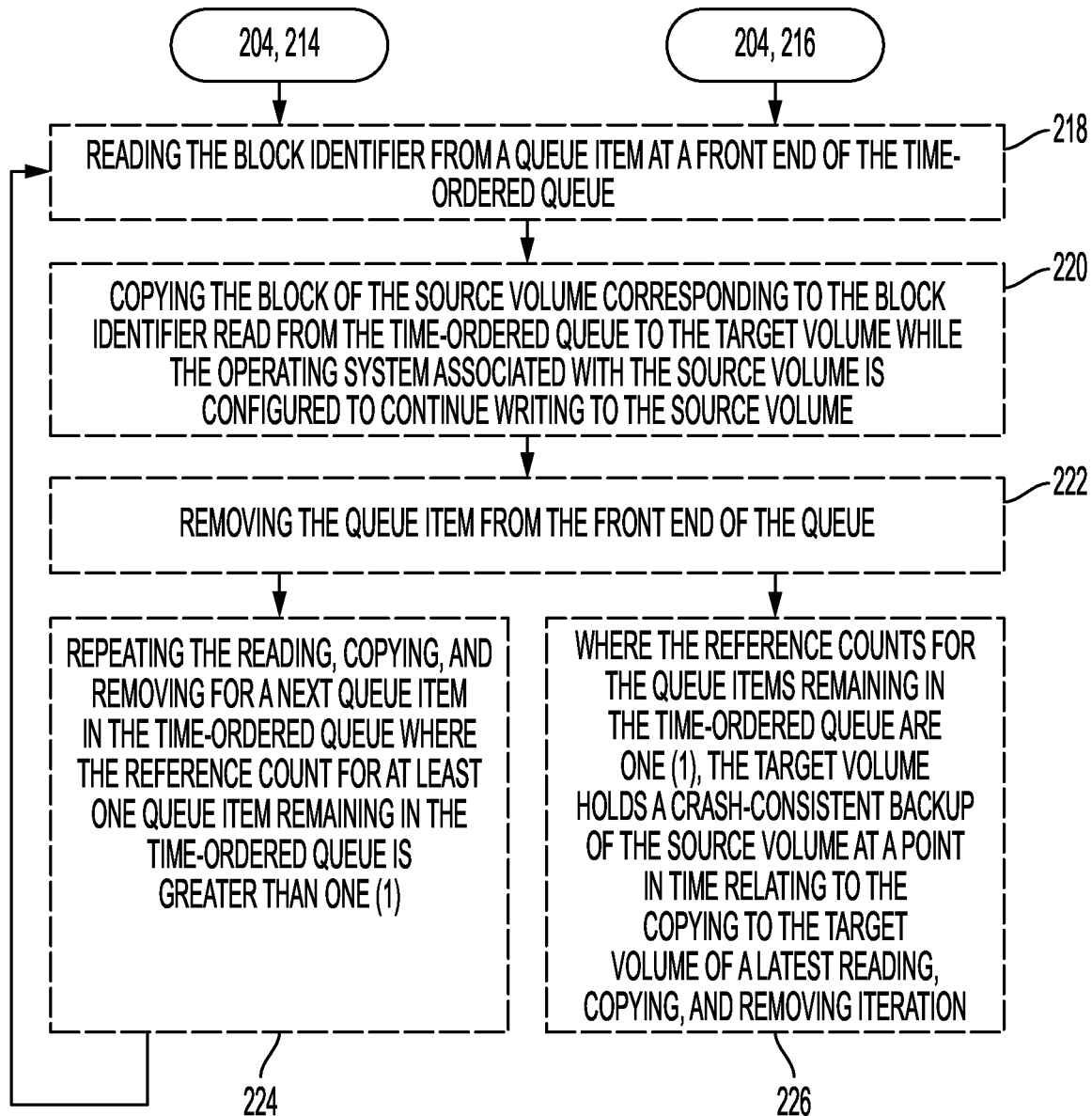

With reference to FIGS. 2A and 2B, an exemplary embodiment of a process 200 for generating a crash-consistent backup of a source volume begins at 202 where at least a portion of a plurality of blocks of a source volume are designated to be copied to a target volume by a backup application program. At 204, one or more blocks of the designated portion of blocks from the source volume are copied to the target volume while an operating system associated with the source volume is configured to continue writing to the source volume. At 206, in conjunction with the copying of the designated portion of blocks, a time-based tracking process associated with the backup application program is initiated. At 208, a time-ordered queue is initiated. Each queue item including a block identifier field, a time field, and a reference count field. At 210, writes to blocks of the source volume are detected. At 212, in conjunction with each detected write, a block identifier for the block of the source volume associated with the detected write is read. At 214, if the block identifier is not present in the time-ordered queue, a reference count for the block identifier is set to one (1) and the block identifier, a time relating to the detected write, and the reference count are added to corresponding fields of a queue item at a back end of the time-ordered queue. From 214, the time-based tracking process continues by returning to 210. At 216, if the block identifier is present in the time-ordered queue, the reference count in the queue item associated with the block identifier is incremented, the time in the queue item is updated to a time relating to the detected write, and the queue item is moved to the back end of the time-ordered queue. From 216, the time-based tracking process continues by returning to 210.

Upon completion of the copying (204) of the designated portion of blocks and while continuing the time-based tracking process (210, 212, 214, 216), the process 200 advances to 218 where the block identifier is read from a queue item at a front end of the time-ordered queue. At 220, the block of the source volume corresponding to the block identifier read from the time-ordered queue is copied to the target volume while the operating system associated with the source volume is configured to continue writing to the source volume. At 222, the queue item is removed from the front end of the queue. At 224, the reading (218), copying (220), and removing (222) are repeated for a next queue item in the time-ordered queue where the reference count for at least one queue item remaining in the time-ordered queue is greater than one (1). At 226, where the reference counts for the queue items remaining in the time-ordered queue are one (1), the target volume holds a crash-consistent backup of the source volume at a point in time relating to the copying (220) to the target volume of a latest reading (218), copying (220), and removing (222) iteration.

In another embodiment of the process 200, the time-ordered queue is implemented in metadata. In yet another embodiment of the process 200, the time-ordered queue is implemented in conjunction with a hash map in which a hash of the block identifier field is keyed to a node representing the reference count for queue items with the same block identifier.

Figure 3:
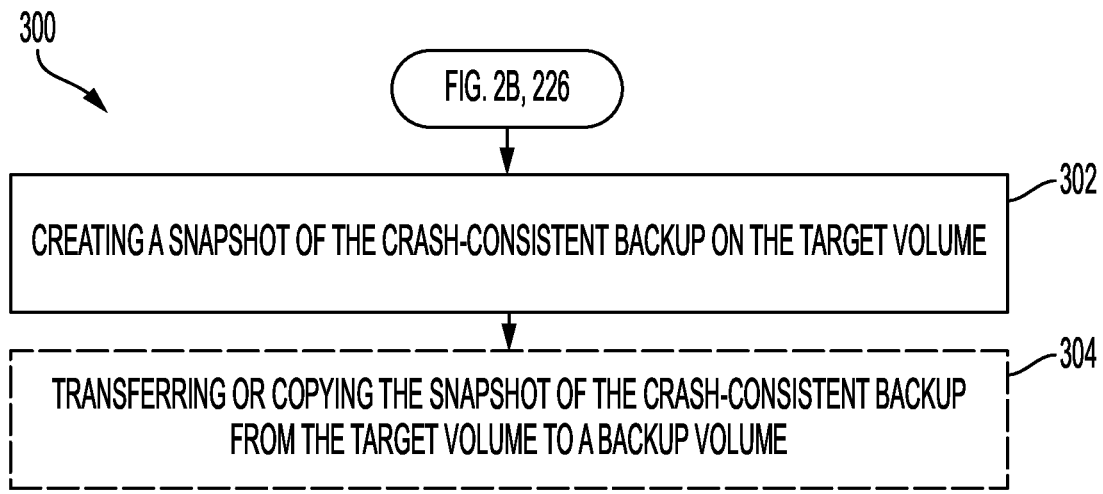
FIG. 3, in combination with FIGS. 2A and 2B, is a flow chart showing yet another exemplary embodiment of a process for generating a crash-consistent backup of a source volume.

With reference to FIG. 3, in combination with FIGS. 2A and 2B, yet another exemplary embodiment of a process 300 for generating a crash-consistent backup of a source volume includes the process 200 of FIGS. 2A and 2B and continues from 226 to 302. In this embodiment, the reference counts for the queue items remaining in the time-ordered queue are one (1) after the latest reading (218), copying (220), and removing (222) iteration. At 302, a snapshot of the crash-consistent backup on the target volume is created. At 304, the snapshot of the crash-consistent backup is transferred from the target volume to a backup volume. The crash-consistent backup on the backup volume relates to a specific point in time associated with the copying (220) to the target volume of the latest reading (218), copying (220), and removing (222) iteration.

Figure 4:
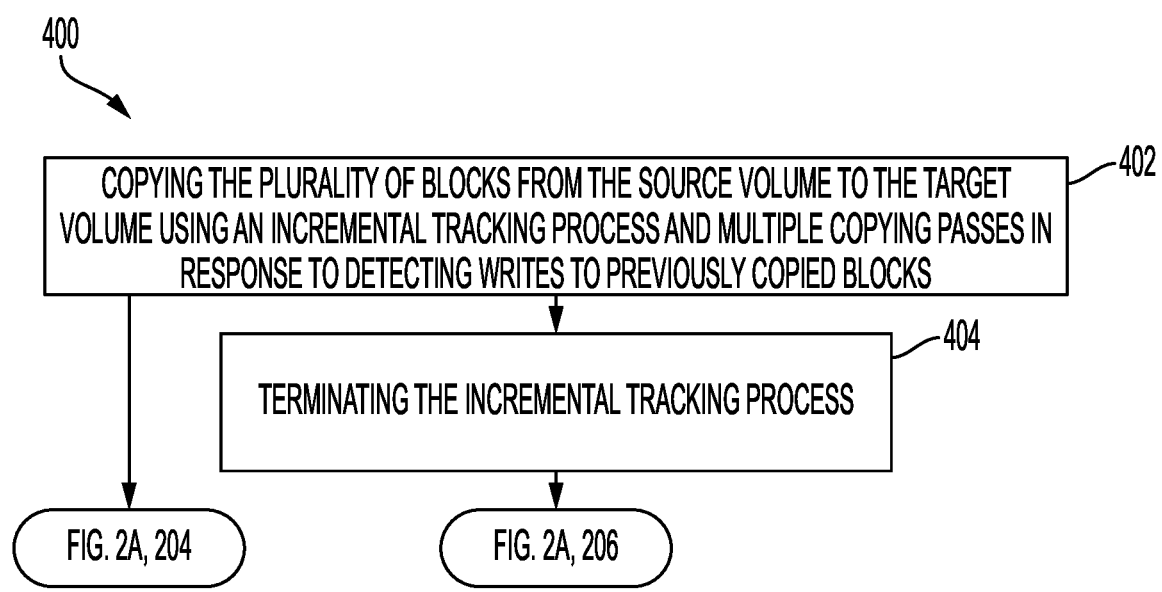
FIG. 4, in combination with FIGS. 2A and 2B, is a flow chart showing still another exemplary embodiment of a process for generating a crash-consistent backup of a source volume.

With reference to FIG. 4, in combination with FIGS. 2A and 2B, still another exemplary embodiment of a process 400 for generating a crash-consistent backup of a source volume includes the process 200 of FIGS. 2A and 2B. In this embodiment, prior to the copying (204) of the designated portion of blocks, the process 400 begins at 402 where the plurality of blocks are copied from the source volume to the target volume. The copying of the plurality of blocks from the source volume to the target volume is performed using an incremental tracking process and multiple copying passes in response to detecting writes to previously copied blocks. The designated portion of blocks (202) are identified by the incremental tracking process during a last copying pass. Thus, the process 400 merges 402 with 202. At 404, in conjunction with initiating (206) of the time-based tracking process, the incremental tracking process is terminated. The process 400 advances from 402 to 204 and advances from 404 to 206. In conjunction with the copying (204) of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

With reference again to FIGS. 2A and 2B, in still yet another embodiment, where the reference counts for the queue items remaining in the time-ordered queue are one (1) after the latest reading (218), copying (220), and removing (222) iteration, the process 200 also includes continuing the time-based tracking process (208, 210, 212, 214, 216) and the copying (218, 220, 222, 224) of blocks of the source volume to the target volume based on the time-ordered queue in relation to a desired calendar time for the crash-consistent backup. After reaching the desired calendar time, continuing the time-based tracking process (208, 210, 212, 214, 216) and the copying (218, 220, 222, 224) of blocks of the source volume to the target volume until the reference counts for the queue items remaining in the time-ordered queue are again one (1). After the reference counts for the queue items remaining in the time-ordered queue are again one (1), creating a snapshot of the crash-consistent backup on the target volume. Then, the snapshot of the crash-consistent backup may be transferred or copied from the target volume to a backup volume. The crash-consistent backup on the backup volume relates to the desired calendar time and to a specific point in time associated with the copying (220) to the target volume of the latest reading (218), copying (220), and removing (222) iteration.

In another embodiment of the process 200, in conjunction with the copying (204) of the designated portion of blocks, the time-based tracking process (206) also includes resetting a crash-inconsistent indicator parameter associated with the time-ordered queue to a zero (0) reference value. In conjunction with each detected write (210, 212, 214, 216), the time-based tracking process also includes incrementing the crash-inconsistent indicator parameter if the block identifier is present in the time-ordered queue. Upon completion of the copying (204) of the designated portion of blocks and while continuing the time-based tracking process (210, 212, 214, 216), the process 200 also includes reading the reference count of the queue item at the front end of the time-ordered queue and decrementing the crash-inconsistent indicator parameter where the reference count for the queue item is greater than one (1). In this embodiment, the reading (218), copying (220), decrementing, and removing (222) are repeated for a next queue item in the time-ordered queue where the crash-inconsistent indicator parameter is greater than zero (0). Where the crash-inconsistent indicator parameter is zero (0), the target volume holds a crash-consistent backup of the source volume at a point in time relating to the copying (220) to the target volume of a latest reading (218), copying (220), decrementing, and removing (222) iteration.

In a further embodiment, where the crash-inconsistent indicator parameter is zero (0), the process 200 also includes creating a snapshot of the crash-consistent backup on the target volume. Then, the snapshot of the crash-consistent backup may be transferred or copied from the target volume to a backup volume. The crash-consistent backup on the backup volume relates to a specific point in time associated with the copying to the target volume of the latest reading, copying, decrementing, and removing iteration.

Figure 5:
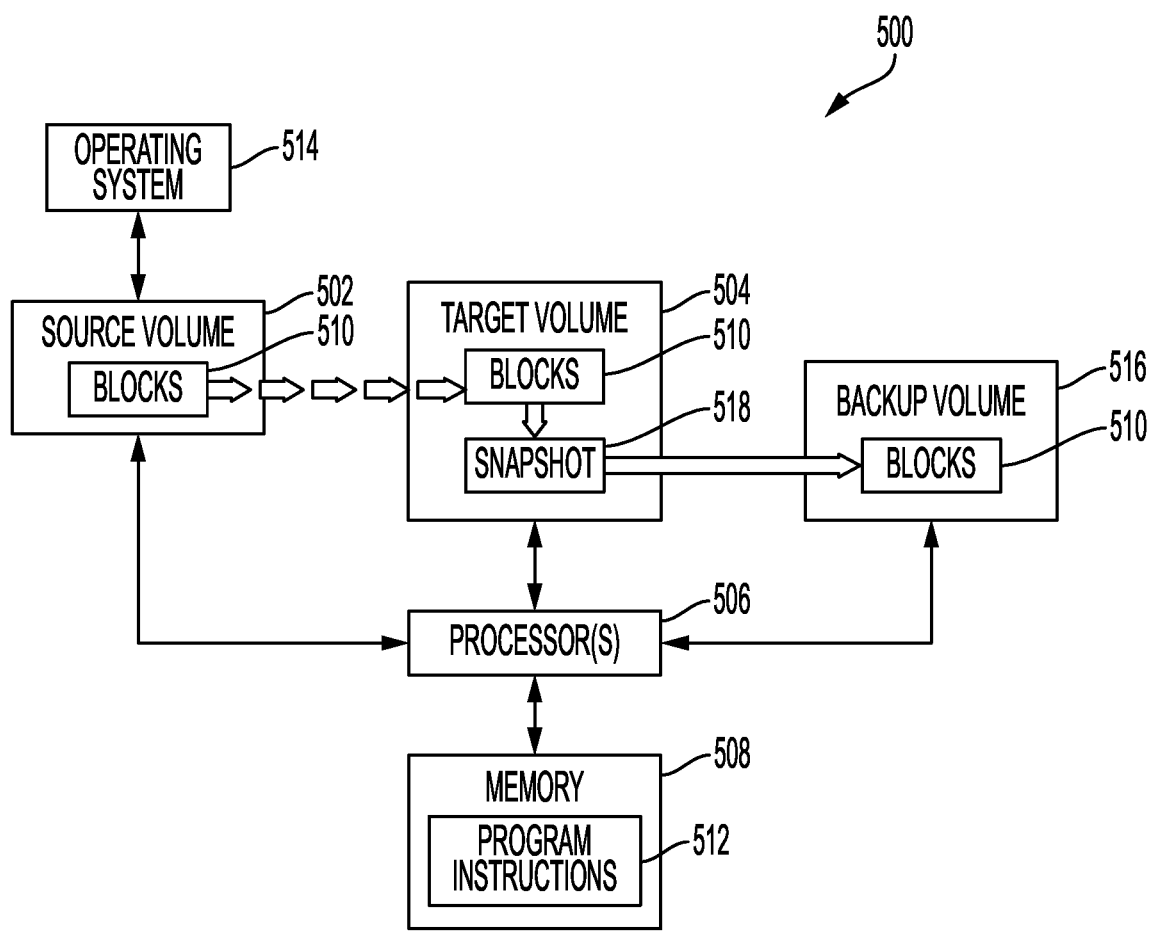
FIG. 5 is a block diagram showing an exemplary embodiment of a system for generating a crash-consistent backup of a source volume.

With reference to FIG. 5, an exemplary embodiment of a system 500 for generating a crash-consistent backup of a source volume includes a source volume 502, a target volume 504, at least one processor 506, and associated memory 508. The source volume 502 configured to store data in a plurality of blocks 510. The target volume 504 in operative communication with the source volume 502 and configured to store a backup of the source volume 502. The at least one processor 506 and associated memory 508 in operative communication with the source volume 502 and the target volume 504. The associated memory 508 storing program instructions 512 that, when executed by the at least one processor 506, cause the system 500 to perform an exemplary embodiment of a method (e.g., see FIGS. 2A and 2B) for generating a crash-consistent backup of the source volume 502.

In this embodiment, the method includes designating at least a portion of the plurality of blocks 510 of the source volume 502 to be copied to the target volume 504. Then, one or more blocks 510 of the designated portion of blocks from the source volume 502 are copied to the target volume 504 while an operating system 514 associated with the source volume 502 is configured to continue writing to the source volume 502. In conjunction with the copying of the designated portion of blocks 510, initiating a time-based tracking process associated with the program instructions 512. The time-based tracking process including initiating a time-ordered queue and detecting writes to blocks 510 of the source volume 502. Each queue item includes a block identifier field, a time field, and a reference count field. In conjunction with each detected write, the time-based tracking process further including reading a block identifier for the block 510 of the source volume 502 associated with the detected write. If the block identifier is not present in the time-ordered queue, setting a reference count for the block identifier to one (1) and adding the block identifier, a time relating to the detected write, and the reference count to corresponding fields of a queue item at a back end of the time-ordered queue. If the block identifier is present in the time-ordered queue, incrementing the reference count in the queue item associated with the block identifier, updating the time in the queue item to a time relating to the detected write, and moving the queue item to the back end of the time-ordered queue.

Upon completion of the copying of the designated portion of blocks 510 and while continuing the time-based tracking process, the method further including reading the block identifier from a queue item at a front end of the time-ordered queue. Then, the block 510 of the source volume 502 corresponding to the block identifier read from the time-ordered queue is copied to the target volume 504 while the operating system 514 associated with the source volume 502 is configured to continue writing to the source volume 502. Next, the queue item is removed from the front end of the queue. Then, the reading, copying, and removing are repeated for a next queue item in the time-ordered queue where the reference count for at least one queue item remaining in the time-ordered queue is greater than one (1). Where the reference counts for the queue items remaining in the time-ordered queue are one (1), the target volume 504 holds a crash-consistent backup of the source volume 502 at a point in time relating to the copying to the target volume 504 of a latest reading, copying, and removing iteration.

In another embodiment, the system 500 also includes a backup volume 516 in operative communication with the at least one processor 506, associated memory 508, and target volume 504 and configured to store a crash-consistent backup of the source volume 502. Where the reference counts for the queue items remaining in the time-ordered queue are one (1) after the latest reading, copying, and removing iteration, the method further including creating a snapshot 518 of the crash-consistent backup on the target volume 504. Then, the snapshot 518 of the crash-consistent backup may be transferred or copied from the target volume 504 to the backup volume 516. The crash-consistent backup on the backup volume 516 relates to a specific point in time associated with the copying to the target volume 504 of the latest reading, copying, and removing iteration.

Figure 6:
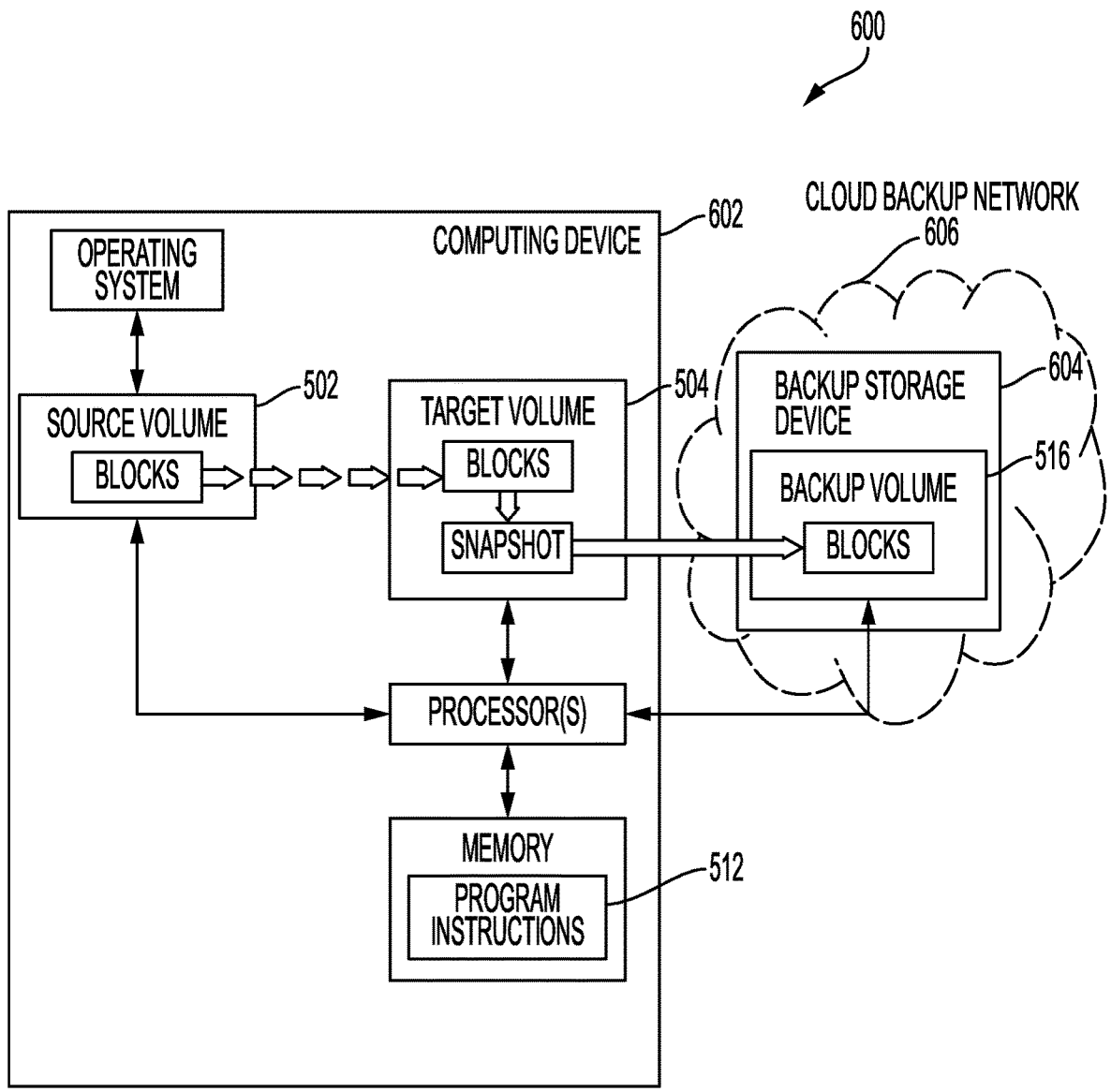
FIG. 6 is a block diagram showing another exemplary embodiment of a system for generating a crash-consistent backup of a source volume.

With reference to FIG. 6, another exemplary embodiment of a system 600 for generating a crash-consistent backup of a source volume includes a computing device 602 and a backup storage device 604. The source volume 502 and target volume 504 are components of the computing device 602. The backup volume 516 is a component of the backup storage device 604. The program instructions 512 are configured to run on the computing device 602. The source volume 502 and target volume 504 are on different storage mediums. The computing device 602 and backup storage device 604 are different devices. In another embodiment of the system 600, the backup storage device 604 is remote in relation to the computing device 602. In yet another embodiment of the system 600, the backup storage device 604 is offsite in relation to the computing device 602. In still another embodiment, the system 600 also includes a cloud backup network 606. The backup storage device 604 is a component of the cloud backup network 606.

Figure 7:
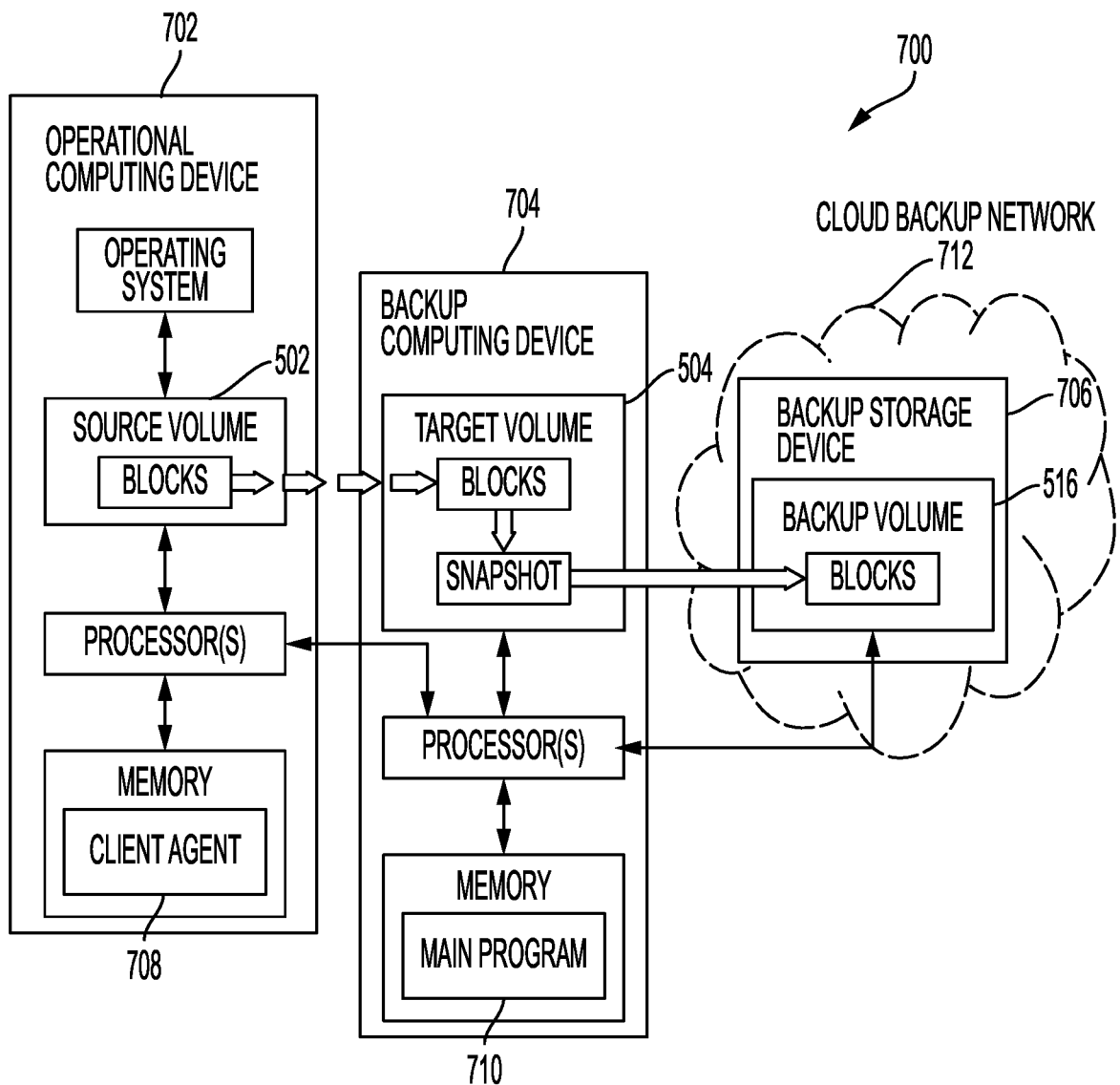
FIG. 7 is a block diagram showing yet another exemplary embodiment of a system for generating a crash-consistent backup of a source volume.

With reference to FIG. 7, yet another exemplary embodiment of a system 700 for generating a crash-consistent backup of a source volume includes an operational computing device 702, a backup computing device 704, and a backup storage device 706. The source volume 502 is a component of the operational computing device 702. The target volume 504 is a component of the backup computing device 704. The backup volume 516 is a component of the backup storage device 706. The program instructions (see FIG. 5, 512) include a client agent 708 that runs on the operational computing device 702 and a main program 710 that runs on the backup computing device 704. The operational computing device 702, backup computing device 704, and backup storage device 706 are different devices. In another embodiment of the system 700, at least the backup storage device 706 is remote in relation to the operational computing device 702. In yet another embodiment of the system 700, at least the backup storage device 706 is offsite in relation to the operational computing device 702. In still another embodiment, the system 700 also includes a cloud backup network 712. The backup storage device 706 is a component of the cloud backup network 712.

Figure 8:
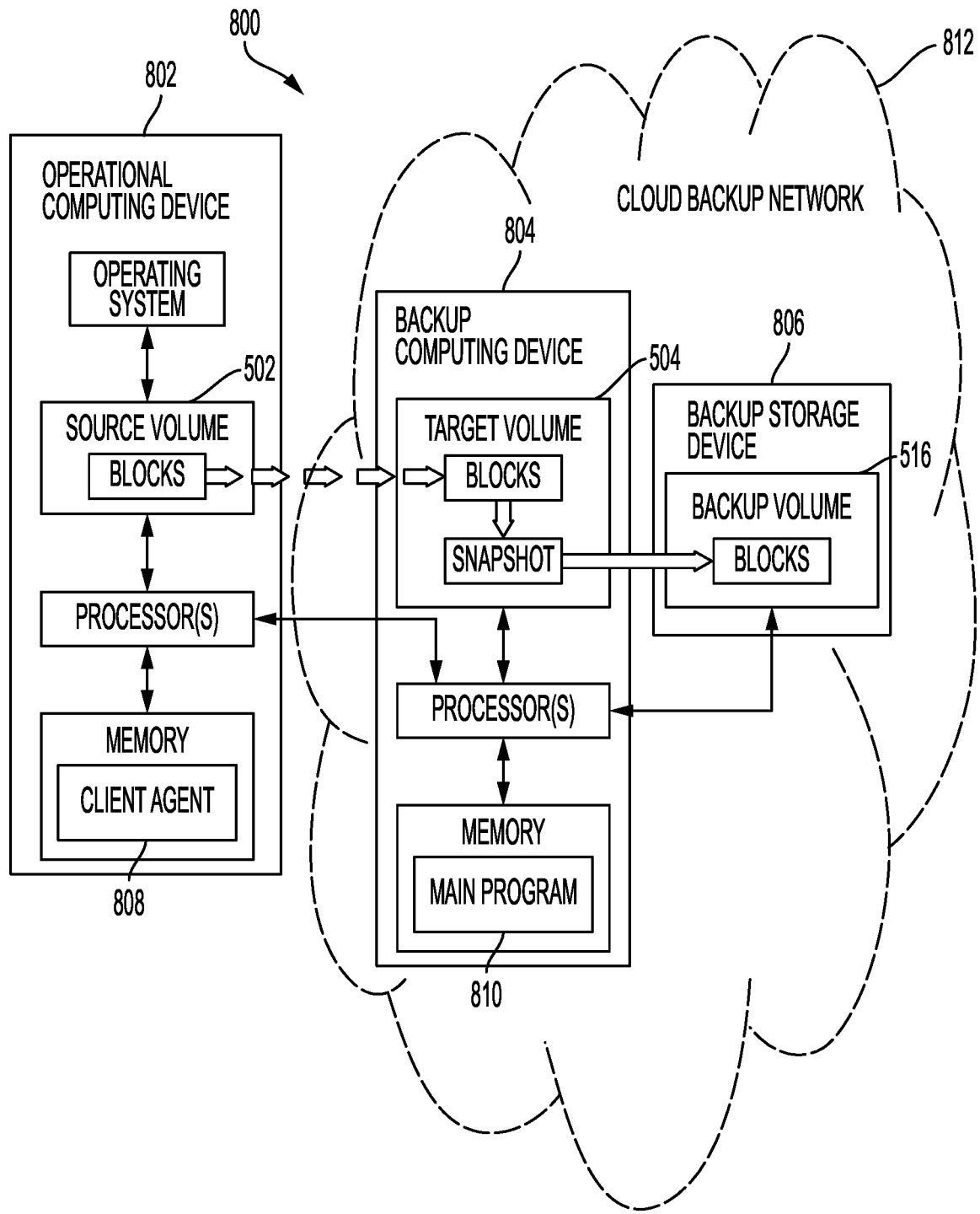
FIG. 8 is a block diagram showing still another exemplary embodiment of a system for generating a crash-consistent backup of a source volume.

With reference to FIG. 8, still another exemplary embodiment of a system 800 for generating a crash-consistent backup of a source volume includes an operational computing device 802, a backup computing device 804, and a backup storage device 806. The source volume 502 is a component of the operational computing device 802. The target volume 504 is a component of the backup computing device 804. The backup volume 516 is a component of the backup storage device 806. The program instructions (see FIG. 5, 512) include a client agent 808 that runs on the operational computing device 802 and a main program 810 that runs on the backup computing device 804. The operational computing device 802, backup computing device 804, and backup storage device 606 are different devices. In another embodiment of the system 800, the backup computing device 804 and backup storage device 806 are remote in relation to the operational computing device 802. In yet another embodiment of the system 800, the backup computing device 804 and backup storage device 806 are offsite in relation to the operational computing device 802. In still another embodiment, the system 700 also includes a cloud backup network 812. The backup computing device 804 and backup storage device 806 are components of the cloud backup network 812.

Figure 9A:
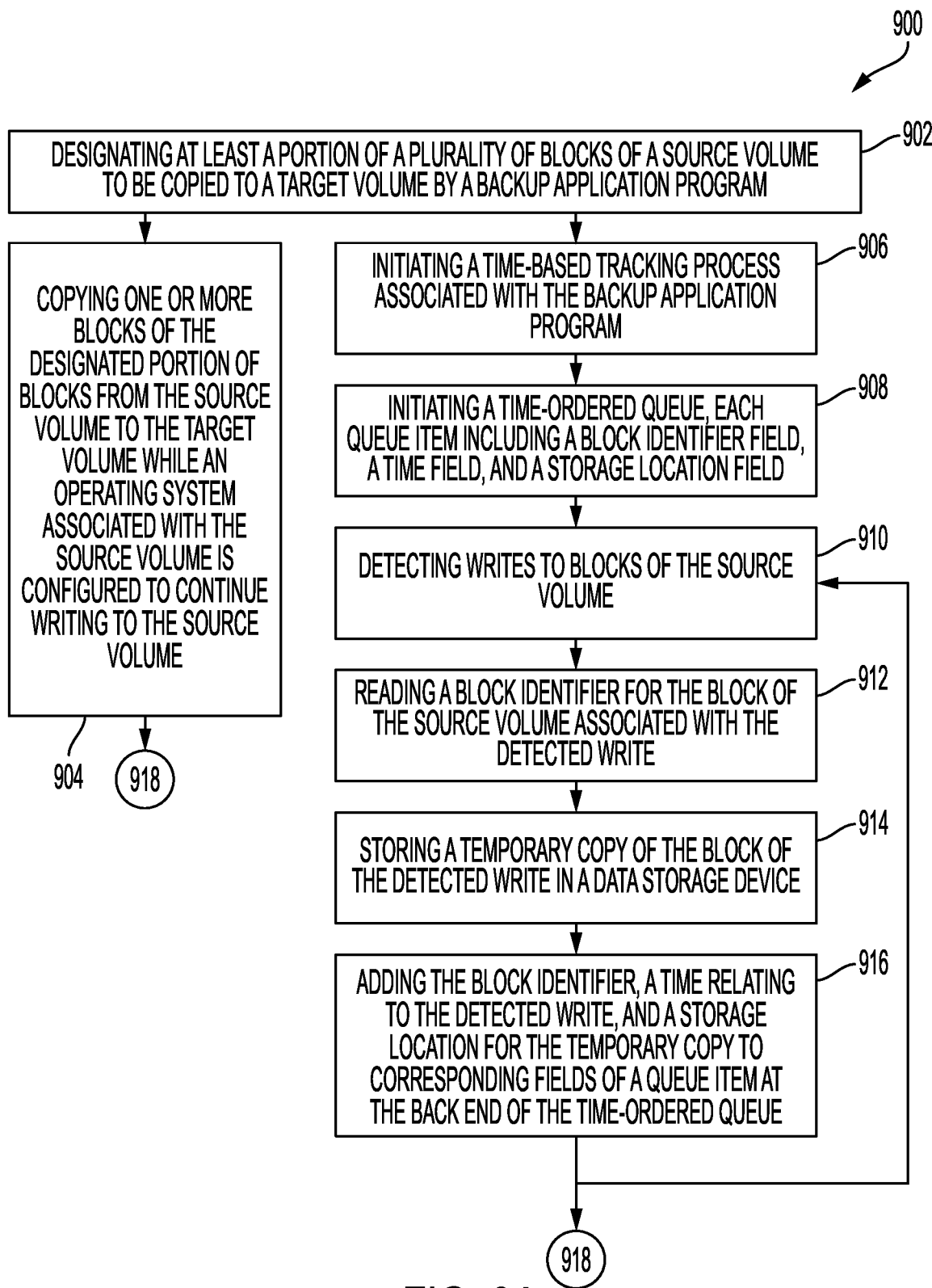
FIGS. 9A and 9B is a flow chart showing still another exemplary embodiment of a process for generating a crash-consistent backup of a source volume.
Figure 9B:
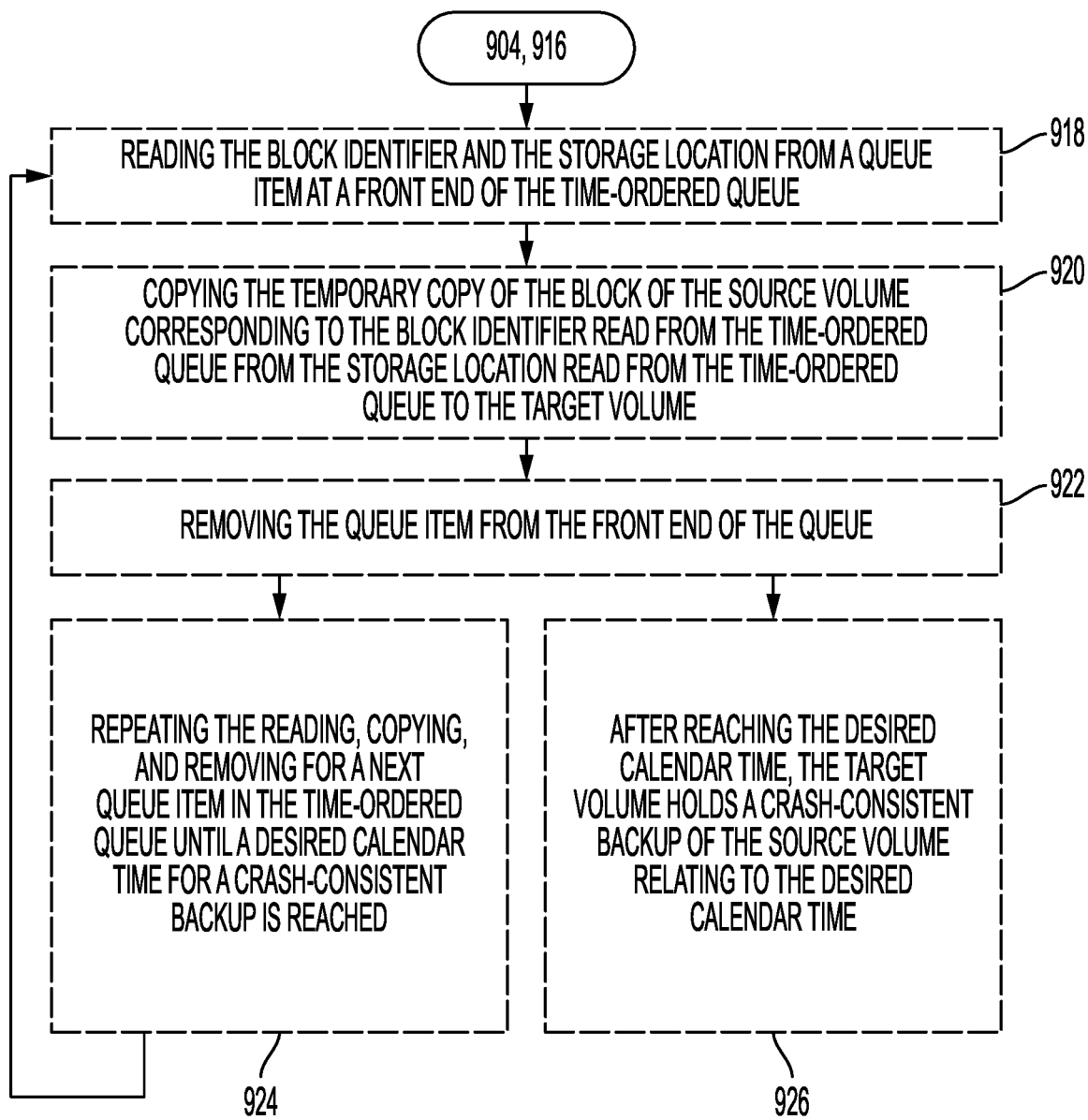

With reference to FIGS. 9A and 9B, an exemplary embodiment of a process 900 for generating a crash-consistent backup of a source volume begins at 902 where at least a portion of a plurality of blocks of a source volume are designated to be copied to a target volume by a backup application program. At 904, one or more blocks of the designated portion of blocks from the source volume are copied to the target volume while an operating system associated with the source volume is configured to continue writing to the source volume. At 906, in conjunction with the copying of the designated portion of blocks, a time-based tracking process associated with the backup application program is initiated. At 908, a time-ordered queue is initiated. Each queue item includes a block identifier field, a time field, and a storage location field. At 910, writes to blocks of the source volume are detected. At 912, in conjunction with each detected write, a block identifier for the block of the source volume associated with the detected write is read. At 914, a temporary copy of the block of the source volume associated with the detected write is stored in a data storage device. At 916, the block identifier, a time relating to the detected write, and a storage location for the temporary copy are added to corresponding fields of a queue item at a back end of the time-ordered queue. From 916, the time-based tracking process continues by returning to 910.

Upon completion of the copying (904) of the designated portion of blocks and while continuing the time-based tracking process (910, 912, 914, 916), the process 900 advances to 918 where the block identifier and the storage location are read from a queue item at a front end of the time-ordered queue. At 920, the temporary copy of the block of the source volume corresponding to the block identifier read from the time-ordered queue at the storage location of the data storage device read from the time-ordered queue is copied to the target volume. At 922, the queue item is removed from the front end of the queue. At 924, the reading (918), copying (920), and removing (922) are repeated for a next queue item in the time-ordered queue until a desired calendar time for a crash-consistent backup is reached. After reaching the desired calendar time, the target volume holds a crash-consistent backup relating to the desired calendar time.

In another embodiment of the process 900, the time-ordered queue is implemented in metadata. In yet another embodiment of the process 900, the time-ordered queue is implemented in conjunction with a hash map in which a hash of the block identifier field is keyed to a node representing the storage location at which a temporary copy of the block associated with the block identifier is stored.

In still another embodiment, after reaching the desired calendar time, the process 900 also includes creating a snapshot of the crash-consistent backup on the target volume. Then, the snapshot of the crash-consistent backup may be transferred or copied from the target volume to a backup volume. The crash-consistent backup on the backup volume relates to a specific point in time associated with the copying (920) to the target volume of the latest reading (918), copying (920), and removing (922) iteration.

In still yet another embodiment, prior to the copying (904) of the designated portion of blocks, the process 900 also includes copying the plurality of blocks from the source volume to the target volume. The copying of the plurality of blocks from the source volume to the target volume is performed using an incremental tracking process and multiple copying passes in response to detecting writes to previously copied blocks. The designated portion of blocks (902) are identified by the incremental tracking process during a last copying pass. In conjunction with initiating (906) the time-based tracking process, the incremental tracking process is terminated. In conjunction with the copying (904) of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

Figure 10:
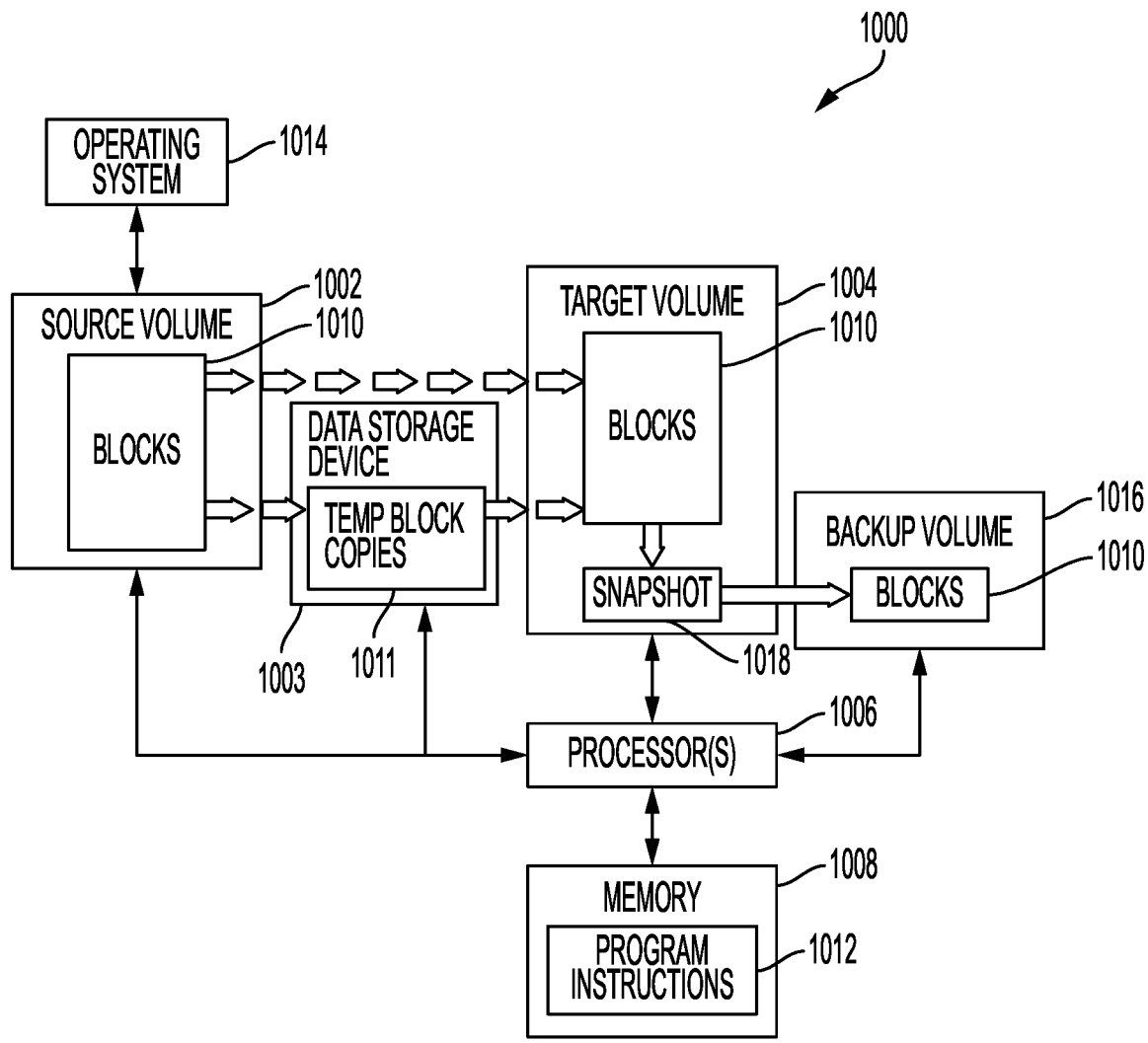
FIG. 10 is a block diagram showing still yet another exemplary embodiment of a system for generating a crash-consistent backup of a source volume.

With reference to FIG. 10, an exemplary embodiment of a system 1000 for generating a crash-consistent backup of a source volume includes a source volume 1002, a data storage device 1003, a target volume 1004, at least one processor 1006, and associated memory 1008. The source volume 1002 configured to store data in a plurality of blocks 1010. The data storage device 1003 in operative communication with the source volume 1002 and configured to store temporary copies 1011 of select blocks 1010 of the source volume 1002. The target volume 1004 in operative communication with the source volume 1002 and the data storage device 1003 and configured to store a backup of the source volume 1002. The at least one processor 1006 and associated memory 1008 in operative communication with the source volume 1002, the data storage device 1003, and the target volume 1004. The associated memory 1008 storing program instructions 1012 that, when executed by the at least one processor 1006, cause the system 1000 to perform an exemplary embodiment of a method (e.g., see FIGS. 9A and 9B) for generating a crash-consistent backup of the source volume 1002.

In this embodiment, the method includes designating at least a portion of the plurality of blocks 1010 of the source volume 1002 to be copied to the target volume 1004. Then, one or more blocks 1010 of the designated portion of blocks from the source volume 1002 are copied to the target volume 1004 while an operating system 1014 associated with the source volume 1002 is configured to continue writing to the source volume 1002. In conjunction with the copying of the designated portion of blocks 1010, initiating a time-based tracking process associated with the program instructions. The time-based tracking process including initiating a time-ordered queue and detecting writes to blocks 1010 of the source volume 1002. Each queue item includes a block identifier field, a time field, and a storage location field. In conjunction with each detected write, the time-based tracking process further including reading a block identifier for the block 1010 of the source volume 1002 associated with the detected write. Then, a temporary copy 1011 of the block 1010 of the source volume 1002 associated with the detected write is stored in the data storage device 1003. Next, the block identifier, a time relating to the detected write, and a storage location for the temporary copy 1011 are added to corresponding fields of a queue item at a back end of the time-ordered queue.

Upon completion of the copying of the designated portion of blocks 1010 and while continuing the time-based tracking process, the method further including reading the block identifier and the storage location from a queue item at a front end of the time-ordered queue. Then, the temporary copy 1011 of the block 1010 of the source volume 1002 corresponding to the block identifier read from the time-ordered queue at the storage location of the data storage device 1003 read from the time-ordered queue is copied to the target volume 1004. Next, the queue item is removed from the front end of the queue. Then, the reading, copying, and removing are repeated for a next queue item in the time-ordered queue until a desired calendar time for a crash-consistent backup is reached. After reaching the desired calendar time, the target volume 1004 holds a crash-consistent backup relating to the desired calendar time.

In another embodiment, the system 1000 also includes a backup volume 1016 in operative communication with the at least one processor 1006, associated memory 1008, and target volume 1004 and configured to store a crash-consistent backup of the source volume 1002. After reaching the desired calendar time, the method further including creating a snapshot 1018 of the crash-consistent backup on the target volume 1004. Then, the snapshot 1018 of the crash-consistent backup may be transferred or copied from the target volume 1004 to the backup volume 1016. The crash-consistent backup on the backup volume 1016 relates to a specific point in time associated with the copying to the target volume 1004 of the latest reading, copying, and removing iteration.

In yet another embodiment, the system 1000 also includes a computing device and a backup storage device. The source volume 1002, data storage device 1003, and target volume 1004 are components of the computing device. The backup volume 1016 is a component of the backup storage device. The program instructions 512 are configured to run on the computing device. The source volume 1002 and target volume 1004 are on different storage mediums. The computing device and backup storage device 1003 are different devices. In a further embodiment, the backup storage device 1003 is remote in relation to the computing device. In another further embodiment, the backup storage device 1003 is offsite in relation to the computing device. In yet another further embodiment, the system 1000 includes a cloud backup network. In this embodiment, the backup storage device 1003 is a component of the cloud backup network.

In still another embodiment, the system 1000 also includes an operational computing device, a backup computing device, and a backup storage device. The source volume 1002 and the data storage device 1003 are components of the operational computing device. The target volume 1004 is a component of the backup computing device. The backup volume 1016 is a component of the backup storage device. The program instructions 1012 include a client agent configured to run on the operational computing device and a main program configured to run on the backup computing device. The operational computing device, backup computing device, and backup storage device are different devices. In a further embodiment, at least one of the backup computing device and backup storage device are remote in relation to the operational computing device. In another further embodiment, at least one of the backup computing device and backup storage device are offsite in relation to the operational computing device. In yet another further embodiment, the system 1000 also includes a cloud backup network. In this embodiment, at least one of the backup computing device and the backup storage device are components of the cloud backup network.

Figure 11A:
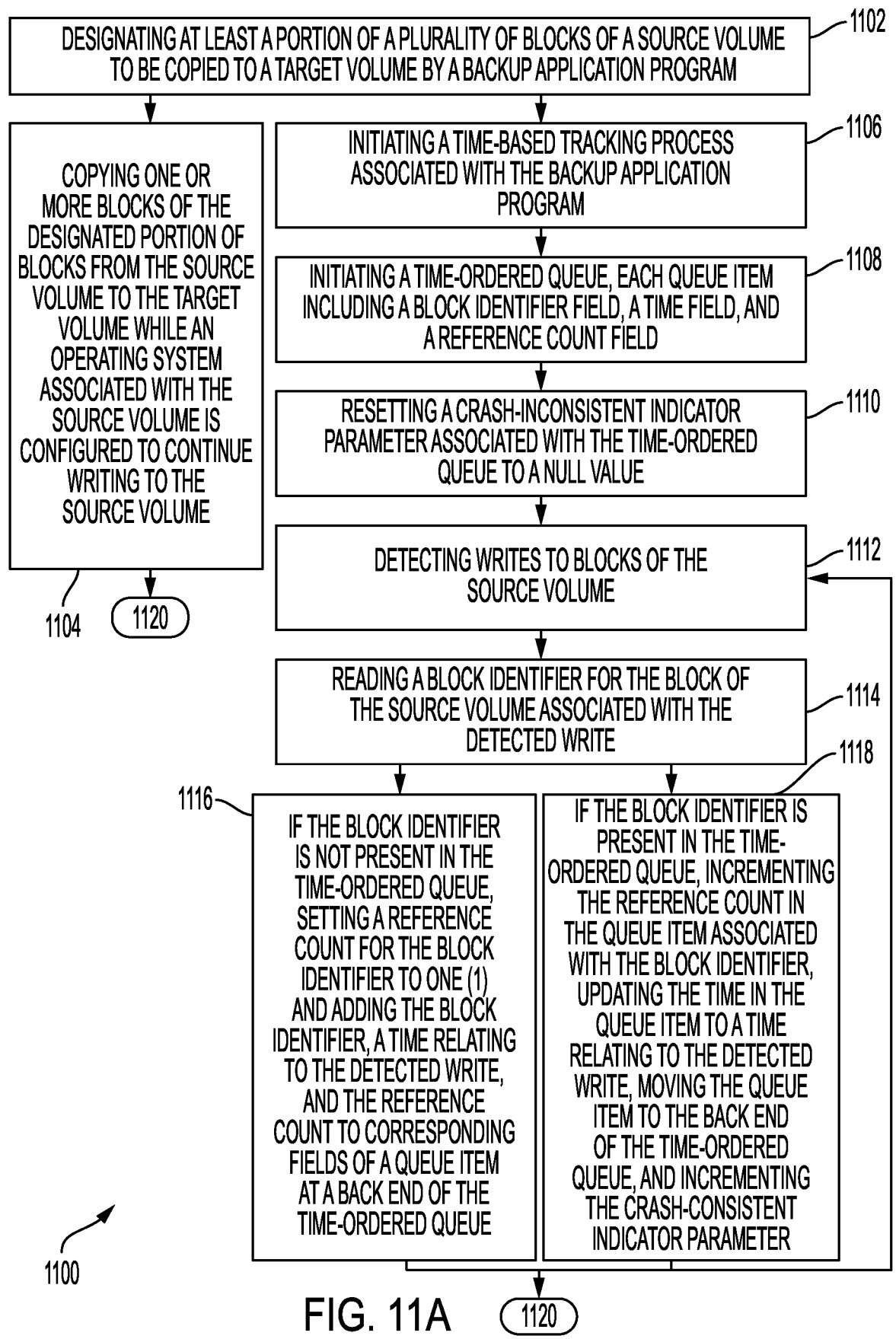
FIGS. 11A and 11B is a flow chart showing still yet another exemplary embodiment of a process for generating a crash-consistent backup of a source volume.
Figure 11B:
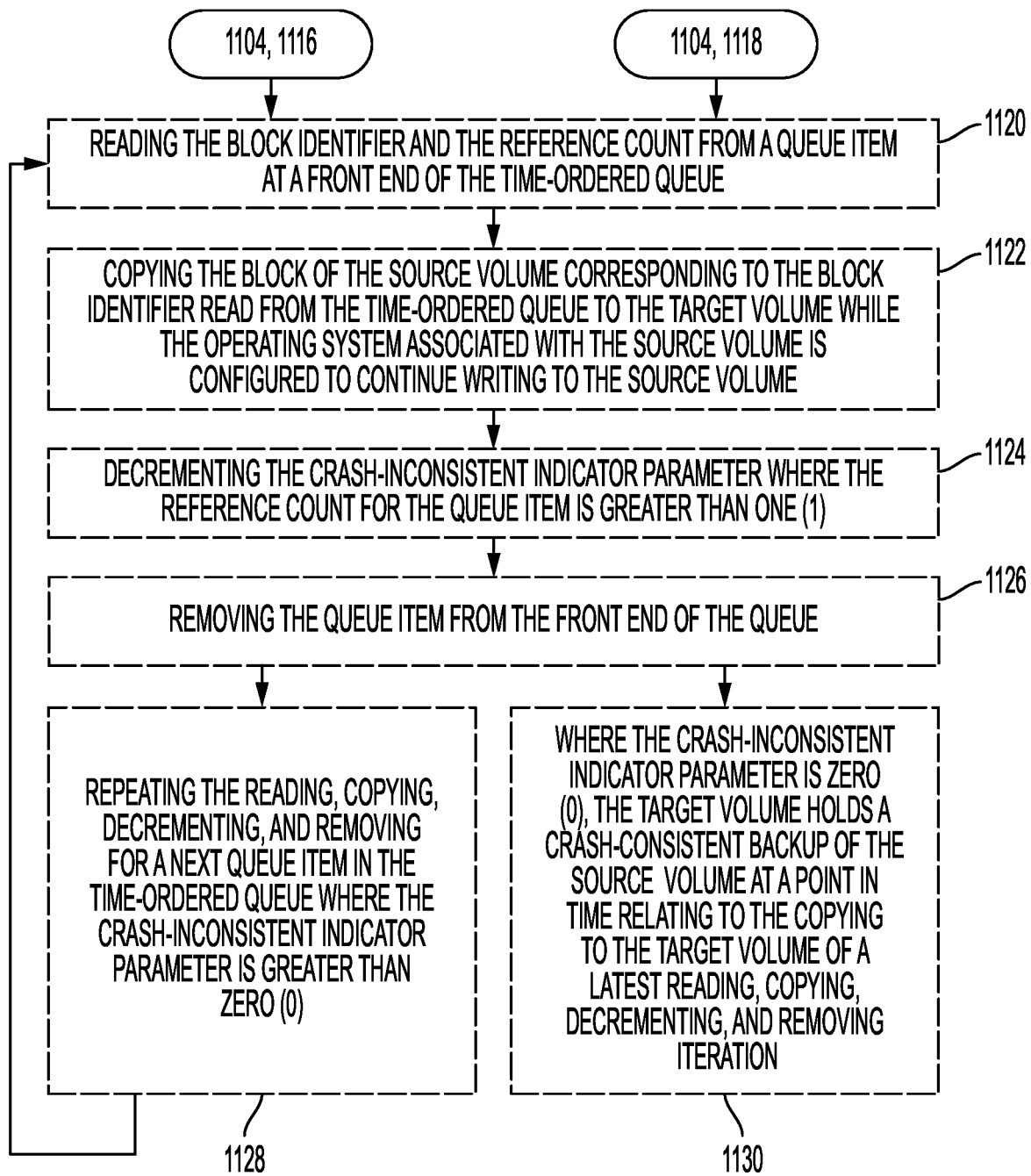

With reference to FIGS. 11A and 11B, an exemplary embodiment of a process 1100 for generating a crash-consistent backup of a source volume begins at 1102 where at least a portion of a plurality of blocks of a source volume are designated to be copied to a target volume by a backup application program. At 1104, one or more blocks of the designated portion of blocks from the source volume are copied to the target volume while an operating system associated with the source volume is configured to continue writing to the source volume. At 1106, in conjunction with the copying of the designated portion of blocks, a time-based tracking process associated with the backup application program is initiated. At 1108, a time-ordered queue is initiated. Each queue item includes a block identifier field, a time field, and a reference count field. At 1110, a crash-inconsistent indicator parameter associated with the time-ordered queue is reset to a zero (0) reference value. At 1112, writes to blocks of the source volume are detected. At 1114, in conjunction with each detected write, a block identifier for the block of the source volume associated with the detected write is read. At 1116, if the block identifier is not present in the time-ordered queue, a reference count for the block identifier is set to one (1) and the block identifier, a time relating to the detected write, and the reference count are added to corresponding fields of a queue item at a back end of the time-ordered queue. From 1116, the time-based tracking process continues by returning to 1110. At 1118, if the block identifier is present in the time-ordered queue, the reference count in the queue item associated with the block identifier is incremented, the time in the queue item is updated to a time relating to the detected write, the queue item is moved to the back end of the time-ordered queue, and the crash-inconsistent indicator parameter is incremented. From 1118, the time-based tracking process continues by returning to 1110.

Upon completion of the copying (1104) of the designated portion of blocks and while continuing the time-based tracking process (1110, 1112, 1114, 1116, 1118), the process advances to 1120 where the block identifier and the reference count are read from a queue item at a front end of the time-ordered queue. At 1122, the block of the source volume corresponding to the block identifier read from the time-ordered queue is copied to the target volume while the operating system associated with the source volume is configured to continue writing to the source volume. At 1124, the crash-inconsistent indicator parameter is decremented where the reference count for the queue item is greater than one (1). At 1126, the queue item is removed from the front end of the queue. At 1128, the reading (1120), copying (1122), decrementing (1124), and removing (1126) are repeated for a next queue item in the time-ordered queue where the crash-inconsistent indicator parameter is greater than zero (0). At 1130, where the crash-inconsistent indicator parameter is zero (0), the target volume holds a crash-consistent backup of the source volume at a point in time relating to the copying (1122) to the target volume of a latest reading (1120), copying (1122), decrementing (1124), and removing (1126) iteration.

In another embodiment of the process 1100, the time-ordered queue is implemented in metadata. In yet another embodiment of the process 1100, the time-ordered queue is implemented in conjunction with a hash map in which a hash of the block identifier field is keyed to a node representing the reference count for queue items with the same block identifier.

In still another embodiment, where the crash-inconsistent indicator parameter is zero (0), the process 1100 also includes creating a snapshot of the crash-consistent backup on the target volume. Then, the snapshot of the crash-consistent backup may be transferred or copied from the target volume to a backup volume. The crash-consistent backup on the backup volume relates to a specific point in time associated with the copying (1122) to the target volume of the latest reading (1120), copying (1122), decrementing (1124), and removing (1126) iteration.

In still yet another embodiment, prior to the copying (1104) of the designated portion of blocks, the process 1100 also includes copying the plurality of blocks from the source volume to the target volume. The copying of the plurality of blocks from the source volume to the target volume is performed using an incremental tracking process and multiple copying passes in response to detecting writes to previously copied blocks. The designated portion of blocks (1102) are identified by the incremental tracking process during a last copying pass. In conjunction with initiating the time-based tracking process, the incremental tracking process is terminated. In conjunction with the copying (1104) of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

In another embodiment, where the crash-inconsistent indicator parameter is zero (0), the process 1100 also includes continuing the time-based tracking process (1112, 1114, 1116, 1118) and the copying (1120, 1122, 1124, 1126, 1128) of blocks of the source volume to the target volume based on the time-ordered queue in relation to a desired calendar time for the crash-consistent backup. After reaching the desired calendar time, continuing the time-based tracking process (1112, 1114, 1116, 1118) and the copying (1120, 1122, 1124, 1126, 1128) of blocks of the source volume to the target volume until the crash-inconsistent indicator parameter is again zero (0). After the crash-inconsistent indicator parameter is again zero (0), creating a snapshot of the crash-consistent backup on the target volume. Then, the snapshot of the crash-consistent backup may be transferred or copied from the target volume to a backup volume. The crash-consistent backup on the backup volume relates to the desired calendar time and to a specific point in time associated with the copying (1122) to the target volume of the latest reading (1120), copying (1122), decrementing (1124), and removing (1126) iteration.

With reference again to FIG. 5, another exemplary embodiment of the system 500 includes associated memory 508 storing program instructions 512 that, when executed by the at least one processor 506, cause the system 500 to perform another exemplary embodiment of a method (e.g., see FIGS. 11A and 11B) for generating a crash-consistent backup of the source volume 502.

In this embodiment, the method includes designating at least a portion of the plurality of blocks 510 of the source volume 502 to be copied to the target volume 504. Then, one or more blocks 510 of the designated portion of blocks from the source volume 502 are copied to the target volume 504 while an operating system 514 associated with the source volume 502 is configured to continue writing to the source volume 502. In conjunction with the copying of the designated portion of blocks 510, initiating a time-based tracking process associated with the program instructions 512. The time-based tracking process including initiating a time-ordered queue, resetting a crash-inconsistent indicator parameter associated with the time-ordered queue to a zero (0) reference value, and detecting writes to blocks 510 of the source volume 502. Each queue item includes a block identifier field, a time field, and a reference count field. In conjunction with each detected write, the time-based tracking process further including reading a block identifier for the block 510 of the source volume 502 associated with the detected write. If the block identifier is not present in the time-ordered queue, setting a reference count for the block identifier to one (1) and adding the block identifier, a time relating to the detected write, and the reference count to corresponding fields of a queue item at a back end of the time-ordered queue. If the block identifier is present in the time-ordered queue, incrementing the reference count in the queue item associated with the block identifier, updating the time in the queue item to a time relating to the detected write, moving the queue item to the back end of the time-ordered queue, and incrementing the crash-inconsistent indicator parameter.

Upon completion of the copying of the designated portion of blocks 510 and while continuing the time-based tracking process, the method further including reading the block identifier and the reference count from a queue item at a front end of the time-ordered queue. Then, the block 510 of the source volume 502 corresponding to the block identifier read from the time-ordered queue is copied to the target volume 504 while the operating system 514 associated with the source volume 502 is configured to continue writing to the source volume 502. Next, the crash-inconsistent indicator parameter is decremented where the reference count for the queue item is greater than one (1). Then, the queue item is removed from the front end of the queue. Then, the reading, copying, decrementing, and removing are repeated for a next queue item in the time-ordered queue where the crash-inconsistent indicator parameter is greater than zero (0). Where the crash-inconsistent indicator parameter is zero (0), the target volume 504 holds a crash-consistent backup of the source volume 502 at a point in time relating to the copying to the target volume 504 of a latest reading, copying, decrementing, and removing iteration.

In another embodiment, the system 500 also includes a backup volume 516 in operative communication with the at least one processor 506, associated memory 508, and target volume 504 and configured to store a crash-consistent backup of the source volume 502. Where the crash-inconsistent indicator parameter is zero (0), the method further including creating a snapshot of the crash-consistent backup on the target volume 504. Then, the snapshot of the crash-consistent backup may be transferred or copied from the target volume 504 to the backup volume 502. The crash-consistent backup on the backup volume 516 relates to a specific point in time associated with the copying to the target volume 504 of the latest reading, copying, decrementing, and removing iteration.

With reference to FIGS. 1-15, various exemplary embodiments of non-transitory computer-readable medium storing program instructions that, when executed by at least one processor (e.g., 506, 1006), cause a computer-controlled device (e.g., 602, 702,704, 706, 802, 804, 806) to perform a method for generating a crash-consistent backup of a source volume (e.g., 100, 200, 300, 400, 900, 1100). For example, various embodiments of a system (e.g., 500, 600, 700, 800, 1000) and computer-controlled devices (e.g., 602, 702, 704, 706, 802, 804, 806) within the system are described above with reference to FIGS. 5-8 and 10. Various embodiments of the method for generating a crash-consistent backup of a source volume are described above with reference to FIGS. 1-4, 9, and 11. In other words, the program instructions of the various exemplary embodiments of non-transitory computer-readable medium are defined by any suitable combination of the processes (e.g., 100, 200, 300, 400, 900, 1100) described above with reference to FIGS. 1-4, 9, and 11. Similarly, the at least one processor (e.g., 506, 1006) associated with the various exemplary embodiments of non-transitory computer-readable medium are defined by any suitable combination of the system (e.g., 500, 600, 700, 800, 1000) and computer-controlled devices (e.g., 602, 702, 704, 706, 802, 804, 806) described above with reference to FIGS. 5-8 and 10.

Example 1 may include an apparatus for generating a crash-consistent backup of a source volume, the apparatus comprising: a source volume configured to store data in a plurality of blocks; a data storage device in operative communication with the source volume and configured to store temporary copies of select blocks of the source volume; a target volume in operative communication with the source volume and the data Storage device and configured to store a backup of the source volume; at least one processor and associated memory in operative communication with the source volume, the data storage device, and the target volume, the associated memory storing program instructions that, when executed by the at least one processor, cause the apparatus to perform a method for generating a crash-consistent backup of the source volume, the method including: designating at least a portion of the plurality of blocks of the source volume to be copied to the target volume; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the program instructions, the time-based tracking process including: initiating a time-ordered queue, wherein each queue item includes a block identifier field, a time field, and a storage location field; and detecting writes to blocks of the source volume; in conjunction with each detected write, the time-based tracking process further including: reading a block identifier for the block of the source volume associated with the detected write; storing a temporary copy of the block of the source volume associated with the detected write in the data storage device; and adding the block identifier, a time relating to the detected write, and a storage location for the temporary copy to corresponding fields of a queue item at a back end of the time-ordered queue; upon completion of the copying of the designated portion of blocks and while continuing the time-based tracking process, the method further including: reading the block identifier and the storage location from a queue item at a front end of the time-ordered queue; copying the temporary copy of the block of the source volume corresponding to the block identifier read from the time-ordered queue at the storage location of the data storage device read from the time-ordered queue to the target volume; removing the queue item from the front end of the queue; and repeating the reading, copying, and removing for a next queue item in the time-ordered queue until a desired calendar time for a crash-consistent backup is reached; wherein, after reaching the desired calendar time, the target volume holds a crash-consistent backup relating to the desired calendar time.

Example 2 may include the apparatus of example 1, further comprising: a backup volume in operative communication with the at least one processor, associated memory, and target volume and configured to store a crash-consistent backup of the source volume; wherein, after reaching the desired calendar time, the method further including: creating a snapshot of the crash-consistent backup on the target volume; and transferring the snapshot of the crash-consistent backup from the target volume to the backup volume; wherein the crash-consistent backup on the backup volume relates to a specific point in time associated with the copying to the target volume of the latest reading, copying, and removing iteration.

Example 3 may include the apparatus of example 2, further comprising: a computing device; and a backup storage device; wherein the source volume, data storage device, and target volume are components of the computing device and the backup volume is a component of the backup storage device; wherein the program instructions are configured to run on the computing device; wherein the source volume and target volume are on different storage mediums and the computing device and backup storage device are different devices.

Example 4 may include the apparatus of example 3, wherein the backup storage device is remote in relation to the computing device.

Example 5 may include the apparatus of example 3, wherein the backup storage device is offsite in relation to the computing device.

Example 6 may include the apparatus of example 3, further comprising: a cloud backup network; wherein the backup storage device is a component of the cloud backup network.

Example 7 may include the apparatus of example 2, further comprising: an operational computing device; a backup computing device; and a backup storage device; wherein the source volume and the data storage device are components of the operational computing device, the target volume is a component of the backup computing device, and the backup volume is a component of the backup storage device; wherein the program instructions include a client agent configured to run on the operational computing device and a main program configured to run on the backup computing device; wherein the operational computing device, backup computing device, and backup storage device are different devices.

Example 8 may include the apparatus of example 7, wherein at least one of the backup computing device and backup storage device are remote in relation to the operational computing device.

Example 9 may include the apparatus of example 7, wherein at least one of the backup computing device and backup storage device are offsite in relation to the operational computing device.

Example 10 may include the apparatus of example 7, further comprising: a cloud backup network; wherein at least one of the backup computing device and the backup storage device are components of the cloud backup network.

Example 11 may include a method for generating a crash-consistent backup of a source volume, comprising: designating at least a portion of a plurality of blocks of a source volume to be copied to a target volume by a backup application program; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the backup application program, the time-based tracking process including: initiating a time-ordered queue, wherein each queue item includes a block identifier field, a time field, and a reference count field; resetting a crash-inconsistent indicator parameter associated with the time-ordered queue to a zero (0) reference value; and detecting writes to blocks of the source volume; in conjunction with each detected write, the time-based tracking process further including: reading a block identifier for the block of the source volume associated with the detected write; if the block identifier is not present in the time-ordered queue, setting a reference count for the block identifier to one (1) and adding the block identifier, a time relating to the detected write, and the reference count to corresponding fields of a queue item at a back end of the time-ordered queue; and if the block identifier is present in the time-ordered queue, incrementing the reference count in the queue item associated with the block identifier, updating the time in the queue item to a time relating to the detected write, moving the queue item to the back end of the time-ordered queue, and incrementing the crash-inconsistent indicator parameter; and upon completion of the copying of the designated portion of blocks and while continuing the time-based tracking process, the method further including: reading the block identifier and the reference count from a queue item at a front end of the time-ordered queue; copying the block of the source volume corresponding to the block identifier read from the time-ordered queue to the target volume while the operating system associated with the source volume is configured to continue writing to the source volume; decrementing the crash-inconsistent indicator parameter where the reference count for the queue item is greater than one (1); removing the queue item from the front end of the queue; and repeating the reading, copying, decrementing, and removing for a next queue item in the time-ordered queue where the crash-inconsistent indicator parameter is greater than zero (0); wherein, where the crash-inconsistent indicator parameter is zero (0), the target volume holds a crash-consistent backup of the source volume at a point in time relating to the copying to the target volume of a latest reading, copying, decrementing, and removing iteration.

Example 12 may include the method of example 11, wherein the time-ordered queue is implemented in metadata.

Example 13 may include the method of example 11, wherein the time-ordered queue is implemented in conjunction with a hash map in which a hash of the block identifier field is keyed to a node representing the reference count for queue items with the same block identifier.

Example 14 may include the method of example 11, where the crash-inconsistent indicator parameter is zero (0), the method further comprising: creating a snapshot of the crash-consistent backup on the target volume; and transferring the snapshot of the crash-consistent backup from the target volume to a backup volume; wherein the crash-consistent backup on the backup volume relates to a specific point in time associated with the copying to the target volume of the latest reading, copying, decrementing, and removing iteration.

Example 15 may include the method of example 11, the method further comprising: prior to the copying of the designated portion of blocks, copying the plurality of blocks from the source volume to the target volume, wherein the copying of the plurality of blocks from the source volume to the target volume is performed using an incremental tracking process and multiple copying passes in response to detecting writes to previously copied blocks, wherein the designated portion of blocks are identified by the incremental tracking process during a last copying pass; and in conjunction with initiating the time-based tracking process, terminating the incremental tracking process; wherein, in conjunction with the copying of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

Example 16 may include the method of example 11, where the crash-inconsistent indicator parameter is zero (0), the method further comprising: continuing the time-based tracking process and the copying of blocks of the source volume to the target volume based on the time-ordered queue in relation to a desired calendar time for the crash-consistent backup; after reaching the desired calendar time, continuing the time-based tracking process and the copying of blocks of the source volume to the target volume until the crash-inconsistent indicator parameter is again zero (0); after the crash-inconsistent indicator parameter is again zero (0), creating a snapshot of the crash-consistent backup on the target volume; and transferring the snapshot of the crash-consistent backup from the target volume to a backup volume; wherein the crash-consistent backup on the backup volume relates to the desired calendar time and to a specific point in time associated with the copying to the target volume of the latest reading, copying, decrementing, and removing iteration.

Example 17 may include an apparatus for generating a crash-consistent backup of a source volume, the apparatus comprising: a source volume configured to store data in a plurality of blocks; a target volume in operative communication with the source volume and configured to store a backup of the source volume; at least one processor and associated memory in operative communication with the source volume and the target volume, the associated memory storing program instructions that, when executed by the at least one processor, cause the apparatus to perform a method for generating a crash-consistent backup of the source volume, the method including: designating at least a portion of the plurality of blocks of the source volume to be copied to the target volume; copying one or more blocks of the designated portion of blocks from the source volume to the target volume while an operating system associated with the source volume is configured to continue writing to the source volume; in conjunction with the copying of the designated portion of blocks, initiating a time-based tracking process associated with the program instructions, the time-based tracking process including: initiating a time-ordered queue, wherein each queue item includes a block identifier field, a time field, and a reference count field; resetting a crash-inconsistent indicator parameter associated with the time-ordered queue to a zero (0) reference value; and detecting writes to blocks of the source volume; in conjunction with each detected write, the time-based tracking process further including: reading a block identifier for the block of the source volume associated with the detected write; if the block identifier is not present in the time-ordered queue, setting a reference count for the block identifier to one (1) and adding the block identifier, a time relating to the detected write, and the reference count to corresponding fields of a queue item at a back end of the time-ordered queue; and if the block identifier is present in the time-ordered queue, incrementing the reference count in the queue item associated with the block identifier, updating the time in the queue item to a time relating to the detected write, moving the queue item to the back end of the time-ordered queue, and incrementing the crash-inconsistent indicator parameter; and upon completion of the copying of the designated portion of blocks and while continuing the time-based tracking process, the method further including: reading the block identifier and the reference count from a queue item at a front end of the time-ordered queue; copying the block of the source volume corresponding to the block identifier read from the time-ordered queue to the target volume while the operating system associated with the source volume is configured to continue writing to the source volume; decrementing the crash-inconsistent indicator parameter where the reference count for the queue item is greater than one (1); removing the queue item from the front end of the queue; and repeating the reading, copying, decrementing, and removing for a next queue item in the time-ordered queue where the crash-inconsistent indicator parameter is greater than zero (0); wherein, where the crash-inconsistent indicator parameter is zero (0), the target volume holds a crash-consistent backup of the source volume at a point in time relating to the copying to the target volume of a latest reading, copying, decrementing, and removing iteration.

Example 18 may include the apparatus of example 17, further comprising: a backup volume in operative communication with the at least one processor, associated memory, and target volume and configured to store a crash-consistent backup of the source volume; wherein, where the crash-inconsistent indicator parameter is zero (0), the method further including: creating a snapshot of the crash-consistent backup on the target volume; and transferring the snapshot of the crash-consistent backup from the target volume to the backup volume; wherein the crash-consistent backup on the backup volume relates to a specific point in time associated with the copying to the target volume of the latest reading, copying, decrementing, and removing iteration.

Example 19 may include the apparatus of example 18, further comprising: a computing device; and a backup storage device; wherein the source volume and target volume are components of the computing device and the backup volume is a component of the backup storage device; wherein the program instructions are configured to run on the computing device; wherein the source volume and target volume are on different storage mediums and the computing device and backup storage device are different devices.

Example 20 may include the apparatus of example 19, wherein the backup storage device is remote in relation to the computing device.

Example 21 may include the apparatus of example 19, wherein the backup storage device is offsite in relation to the computing device.

Example 22 may include the apparatus of example 19, further comprising: a cloud backup network; wherein the backup storage device is a component of the cloud backup network.

Example 23 may include the apparatus of example 19, further comprising: an operational computing device; a backup computing device; and a backup storage device; wherein the source volume is a component of the operational computing device, the target volume is a component of the backup computing device, and the backup volume is a component of the backup storage device; wherein the program instructions include a client agent configured to run on the operational computing device and a main program configured to run on the backup computing device; wherein the operational computing device, backup computing device, and backup storage device are different devices.

Example 24 may include the apparatus of example 23, wherein at least one of the backup computing device and backup storage device are remote in relation to the operational computing device.

Example 25 may include the apparatus of example 23, wherein at least one of the backup computing device and backup storage device are offsite in relation to the operational computing device.

Example 26 may include the apparatus of example 23, wherein at least one of the backup computing device and the backup storage device are components of a cloud backup network.

Some portions of the detailed description herein are presented in terms of algorithms and symbolic representations of operations on data bits performed by conventional computer components, including a central processing unit (CPU) (e.g., processor), memory storage devices for the CPU, and connected display devices. These algorithmic descriptions and representations are the means used by those skilled in the data processing arts to convey the substance of their work most effectively to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and othenivise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated othenivise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiments are not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A method for generating a crash-consistent backup of a source volume, comprising:
    designating at least a portion of a plurality of blocks of a source volume to be copied to a target volume by a backup application program;
    copying one or more blocks of the designated portion of blocks from the source volume to the target volume while an operating system associated with the source volume is configured to continue writing to the source volume;
    in conjunction with the copying of the designated portion of blocks, initiating a time-based tracking process associated with the backup application program, the time-based tracking process including:
        initiating a time-ordered queue, wherein each queue item includes a block identifier field, a time field, and a reference count field; and
        detecting writes to blocks of the source volume; and
    in conjunction with each detected write, the time-based tracking process further including:
        reading a block identifier for the block of the source volume associated with the detected write;
        if the block identifier is not present in the time-ordered queue, setting a reference count for the block identifier to one (1) and adding the block identifier, a time relating to the detected write, and the reference count to corresponding fields of a queue item at a back end of the time-ordered queue; and
        if the block identifier is present in the time-ordered queue, incrementing the reference count in the queue item associated with the block identifier, updating the time in the queue item to a time relating to the detected write, and moving the queue item to the back end of the time-ordered queue.

2. The method of claim 1, wherein the time-ordered queue is implemented in conjunction with a hash map in which a hash of the block identifier field is keyed to a node representing the reference count for queue items with the same block identifier.

3. The method of claim 1, the method further comprising:
    prior to the copying of the designated portion of blocks, copying the plurality of blocks from the source volume to the target volume, wherein the copying of the plurality of blocks from the source volume to the target volume is performed using an incremental tracking process and multiple copying passes in response to detecting writes to previously copied blocks, wherein the designated portion of blocks are identified by the incremental tracking process during a last copying pass; and
    in conjunction with initiating the time-based tracking process, terminating the incremental tracking process;
    wherein, in conjunction with the copying of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

4. The method of claim 1, upon completion of the copying of the designated portion of blocks and while continuing the time-based tracking process, the method further comprising:
    reading the block identifier from a queue item at a front end of the time-ordered queue;
    copying the block of the source volume corresponding to the block identifier read from the time-ordered queue to the target volume while the operating system associated with the source volume is configured to continue writing to the source volume;
    removing the queue item from the front end of the queue; and
    repeating the reading, copying, and removing for a next queue item in the time-ordered queue where the reference count for at least one queue item remaining in the time-ordered queue is greater than one (1);
    wherein, where the reference counts for the queue items remaining in the time-ordered queue are one (1), the target volume holds a crash-consistent backup of the source volume at a point in time relating to the copying to the target volume of a latest reading, copying, and removing iteration.

5. The method of claim 4, where the reference counts for the queue items remaining in the time-ordered queue are one (1) after the latest reading, copying, and removing iteration, the method further comprising:
    creating a snapshot of the crash-consistent backup on the target volume; and
    transferring the snapshot of the crash-consistent backup from the target volume to a backup volume;
    wherein the crash-consistent backup on the backup volume relates to a specific point in time associated with the copying to the target volume of the latest reading, copying, and removing iteration.

6. The method of claim 4, where the reference counts for the queue items remaining in the time-ordered queue are one (1) after the latest reading, copying, and removing iteration, the method further comprising:
    continuing the time-based tracking process and the copying of blocks of the source volume to the target volume based on the time-ordered queue in relation to a desired calendar time for the crash-consistent backup;
    after reaching the desired calendar time, continuing the time-based tracking process and the copying of blocks of the source volume to the target volume until the reference counts for the queue items remaining in the time-ordered queue are again one (1);
    after the reference counts for the queue items remaining in the time-ordered queue are again one (1), creating a snapshot of the crash-consistent backup on the target volume; and transferring the snapshot of the crash-consistent backup from the target volume to a backup volume;

wherein the crash-consistent backup on the backup volume relates to the desired calendar time and to a specific point in time associated with the copying to the target volume of the latest reading, copying, and removing iteration.

7. The method of claim 4, further comprising:

in conjunction with the copying of the designated portion of blocks, the time-based tracking process including:
resetting a crash-inconsistent indicator parameter associated with the time-ordered queue to a zero (0) reference value;

in conjunction with each detected write, the time-based tracking process further including:
if the block identifier is present in the time-ordered queue, incrementing the crash-inconsistent indicator parameter; and upon completion of the copying of the designated portion of blocks and while continuing the time-based tracking process, the method further including:
reading the reference count of the queue item at the front end of the time-ordered queue;
decrementing the crash-inconsistent indicator parameter where the reference count for the queue item is greater than one (1); and
repeating the reading, copying, decrementing, and removing for a next queue item in the time-ordered queue where the crash-inconsistent indicator parameter is greater than zero (0);

wherein, where the crash-inconsistent indicator parameter is zero (0), the target volume holds a crash-consistent backup of the source volume at a point in time relating to the copying to the target volume of a latest reading, copying, decrementing, and removing iteration.

8. The method of claim 7, where the crash-inconsistent indicator parameter is zero (0), the method further comprising:

creating a snapshot of the crash-consistent backup on the target volume; and
transferring the snapshot of the crash-consistent backup from the target volume to a backup volume;
wherein the crash-consistent backup on the backup volume relates to a specific point in time associated with the copying to the target volume of the latest reading, copying, decrementing, and removing iteration.

9. The method of claim 7, where the crash-inconsistent indicator parameter is zero (0), the method further comprising:

continuing the time-based tracking process and the copying of blocks of the source volume to the target volume based on the time-ordered queue in relation to a desired calendar time for the crash-consistent backup;
after reaching the desired calendar time, continuing the time-based tracking process and the copying of blocks of the source volume to the target volume until the crash-inconsistent indicator parameter is again zero (0);
after the crash-inconsistent indicator parameter is again zero (0), creating a snapshot of the crash-consistent backup on the target volume; and
transferring the snapshot of the crash-consistent backup from the target volume to a backup volume;
wherein the crash-consistent backup on the backup volume relates to the desired calendar time and to a specific point in time associated with the copying to the target volume of the latest reading, copying, decrementing, and removing iteration.

10. An apparatus for generating a crash-consistent backup of a source volume, the apparatus comprising:

a source volume configured to store data in a plurality of blocks;
a target volume in operative communication with the source volume and configured to store a backup of the source volume;
at least one processor and associated memory in operative communication with the source volume and the target volume, the associated memory storing program instructions that, when executed by the at least one processor, cause the apparatus to perform a method for generating a crash-consistent backup of the source volume, the method including:
designating at least a portion of the plurality of blocks of the source volume to be copied to the target volume;
copying one or more blocks of the designated portion of blocks from the source volume to the target volume while an operating system associated with the source volume is configured to continue writing to the source volume;
in conjunction with the copying of the designated portion of blocks, initiating a time-based tracking process associated with the program instructions, the time-based tracking process including:
initiating a time-ordered queue, wherein each queue item includes a block identifier field, a time field, and a reference count field; and
detecting writes to blocks of the source volume;
in conjunction with each detected write, the time-based tracking process further including:
reading a block identifier for the block of the source volume associated with the detected write;
if the block identifier is not present in the time-ordered queue, setting a reference count for the block identifier to one (1) and adding the block identifier, a time relating to the detected write, and the reference count to corresponding fields of a queue item at a back end of the time-ordered queue; and
if the block identifier is present in the time-ordered queue, incrementing the reference count in the queue item associated with the block identifier, updating the time in the queue item to a time relating to the detected write, and moving the queue item to the back end of the time-ordered queue; and
upon completion of the copying of the designated portion of blocks and while continuing the time-based tracking process, the method further including:
reading the block identifier from a queue item at a front end of the time-ordered queue;
copying the block of the source volume corresponding to the block identifier read from the time-ordered queue to the target volume while the operating system associated with the source volume is configured to continue writing to the source volume;
removing the queue item from the front end of the queue; and
repeating the reading, copying, and removing for a next queue item in the time-ordered queue where the reference count for at least one queue item remaining in the time-ordered queue is greater than one (1);
wherein, where the reference counts for the queue items remaining in the time-ordered queue are one (1), the target volume holds a crash-consistent backup of the source volume at a point in time relating to the copying to the target volume of a latest reading, copying, and removing iteration.

11. The apparatus of claim 10, further comprising:
a backup volume in operative communication with the at least one processor, associated memory, and target volume and configured to store a crash-consistent backup of the source volume;
wherein, where the reference counts for the queue items remaining in the time-ordered queue are one (1) after the latest reading, copying, and removing iteration, the method further including:
creating a snapshot of the crash-consistent backup on the target volume; and
transferring the snapshot of the crash-consistent backup from the target volume to the backup volume;
wherein the crash-consistent backup on the backup volume relates to a specific point in time associated with the copying to the target volume of the latest reading, copying, and removing iteration.

12. The apparatus of claim 11, further comprising:
a computing device; and
a backup storage device;
wherein the source volume and target volume are components of the computing device and the backup volume is a component of the backup storage device;
wherein the program instructions are configured to run on the computing device;
wherein the source volume and target volume are on different storage mediums and the computing device and backup storage device are different devices.

13. The apparatus of claim 12, further comprising:
a cloud backup network;
wherein the backup storage device is a component of the cloud backup network.

14. The apparatus of claim 11, further comprising:
an operational computing device;
a backup computing device; and
a backup storage device;
wherein the source volume is a component of the operational computing device, the target volume is a component of the backup computing device, and the backup volume is a component of the backup storage device;
wherein the program instructions include a client agent that runs on the operational computing device and a main program that runs on the backup computing device;
wherein the operational computing device, backup computing device, and backup storage device are different devices.

15. The apparatus of claim 14, further comprising:
a cloud backup network;
wherein at least one of the backup computing device and the backup storage device are components of the cloud backup network.

16. A method for generating a crash-consistent backup of a source volume, comprising:
designating at least a portion of a plurality of blocks of a source volume to be copied to a target volume by a backup application program;
copying one or more blocks of the designated portion of blocks from the source volume to the target volume while an operating system associated with the source volume is configured to continue writing to the source volume;
in conjunction with the copying of the designated portion of blocks, initiating a time-based tracking process associated with the backup application program, the time-based tracking process including:
initiating a time-ordered queue, wherein each queue item includes a block identifier field, a time field, and a storage location field; and
detecting writes to blocks of the source volume; and
in conjunction with each detected write, the time-based tracking process further including:
reading a block identifier for the block of the source volume associated with the detected write;
storing a temporary copy of the block of the source volume associated with the detected write in a data storage device; and
adding the block identifier, a time relating to the detected write, and a storage location for the temporary copy to corresponding fields of a queue item at a back end of the time-ordered queue.

17. The method of claim 16, wherein the time-ordered queue is implemented in conjunction with a hash map in which a hash of the block identifier field is keyed to a node representing the storage location at which a temporary copy of the block associated with the block identifier is stored.

18. The method of claim 16, the method further comprising:
prior to the copying of the designated portion of blocks, copying the plurality of blocks from the source volume to the target volume, wherein the copying of the plurality of blocks from the source volume to the target volume is performed using an incremental tracking process and multiple copying passes in response to detecting writes to previously copied blocks, wherein the designated portion of blocks are identified by the incremental tracking process during a last copying pass; and
in conjunction with initiating the time-based tracking process, terminating the incremental tracking process;
wherein, in conjunction with the copying of the designated portion of blocks, the target volume holds a crash-inconsistent backup of the source volume because the incremental tracking process detected the designated portion of blocks as blocks on the source volume that were written to by the operating system during the last copying pass after such blocks were copied to the target volume.

19. The method of claim 16, upon completion of the copying of the designated portion of blocks and while continuing the time-based tracking process, the method further comprising:
reading the block identifier and the storage location from a queue item at a front end of the time-ordered queue;
copying the temporary copy of the block of the source volume corresponding to the block identifier read from the time-ordered queue at the storage location of the data storage device read from the time-ordered queue to the target volume;
removing the queue item from the front end of the queue; and
repeating the reading, copying, and removing for a next queue item in the time-ordered queue until a desired calendar time for a crash-consistent backup is reached;
wherein, after reaching the desired calendar time, the target volume holds a crash-consistent backup relating to the desired calendar time.

20. The method of claim 19, after reaching the desired calendar time, the method further comprising:
creating a snapshot of the crash-consistent backup on the target volume; and
transferring the snapshot of the crash-consistent backup from the target volume to a backup volume;

wherein the crash-consistent backup on the backup volume relates to a specific point in time associated with the copying to the target volume of the latest reading, copying, and removing iteration.

\* \* \* \* \*